United States Patent
Shindo

(10) Patent No.: US 9,426,705 B2
(45) Date of Patent: Aug. 23, 2016

(54) RADIO BASE STATION, SERVER, MOBILE COMMUNICATION SYSTEM, AND OPERATION CONTROL METHOD

(71) Applicant: Masato Shindo, Tokyo (JP)

(72) Inventor: Masato Shindo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 53 days.

(21) Appl. No.: 14/357,743

(22) PCT Filed: Sep. 27, 2012

(86) PCT No.: PCT/JP2012/006178
§ 371 (c)(1),
(2) Date: May 12, 2014

(87) PCT Pub. No.: WO2013/088616
PCT Pub. Date: Jun. 20, 2013

(65) Prior Publication Data
US 2014/0314050 A1    Oct. 23, 2014

(30) Foreign Application Priority Data

Dec. 14, 2011  (JP) ................... 2011-272879

(51) Int. Cl.
*H04W 36/00*   (2009.01)
*H04W 76/02*   (2009.01)
(Continued)

(52) U.S. Cl.
CPC .......... *H04W 36/0083* (2013.01); *H04W 24/02* (2013.01); *H04W 76/02* (2013.01); *H04W 76/022* (2013.01); *H04W 92/20* (2013.01)

(58) Field of Classification Search
CPC . H04W 36/0083; H04W 24/02; H04W 76/02; H04W 92/20
See application file for complete search history.

(56) References Cited

U.S. PATENT DOCUMENTS

| | | | |
|---|---|---|---|
| 2010/0169412 A1* | 7/2010 | Gupta | H04L 63/102 709/203 |
| 2010/0216486 A1* | 8/2010 | Kwon | H04W 72/0426 455/452.2 |
| 2010/0248723 A1 | 9/2010 | Yasuoka | |

(Continued)

FOREIGN PATENT DOCUMENTS

| | | |
|---|---|---|
| EP | 2 712 260 A1 | 3/2014 |
| JP | 2010-233144 A | 10/2010 |

(Continued)

OTHER PUBLICATIONS

Japanese Office Action dated May 12, 2015 with an English translation thereof.

(Continued)

*Primary Examiner* — Mohammad Anwar
(74) *Attorney, Agent, or Firm* — McGinn IP Law Group PLLC

(57) ABSTRACT

A mobile communication system includes a radio base stations and further includes a determination unit for determining, on the basis of attribute information of the radio base stations, whether to establish a logical interface between the radio base stations. Since it is arranged that the determination unit determines, on the basis of attribute information of the radio base stations, whether to establish a logical interface between the radio base stations, the establishment of unnecessary logical interface (i.e., logical interface for which the necessity of maintenance is low) can be suppressed.

17 Claims, 25 Drawing Sheets

(51) Int. Cl.
*H04W 24/02* (2009.01)
*H04W 92/20* (2009.01)

(56) References Cited

U.S. PATENT DOCUMENTS

2010/0323699 A1    12/2010  Hashimoto
2012/0225646 A1*    9/2012  Mochida ............. H04W 84/042
                                                          455/422.1

FOREIGN PATENT DOCUMENTS

| JP | 2011-4101 A | 1/2011 |
|----|-------------|--------|
| JP | 2011-109710 A | 6/2011 |
| WO | WO 2010/063306 A1 | 6/2010 |
| WO | WO 2010/078270 A2 | 7/2010 |
| WO | WO 2011/078328 A1 | 6/2011 |

OTHER PUBLICATIONS

International Search Report (ISR) (PCT Form PCT/ISA/210), in PCT/JP2012/006178, dated Oct. 23, 2012.
3GPP TS 36.423 V 9.6.0 (Mar. 2011) $3^{rd}$ Generation Partnership Project; Technical Specification Group Radio Access Network; "Evolved Universal Terrestrial Radio Access Network; (E-UTRAN); X2 application protocol (X2AP)" (Release 9).
RFC 4960 (Sep. 2007); R. Stewart "Stream Control Transmission Protocol".
3GPP TS 36.422 V 10.1.0 (Jun. 2011) $3^{rd}$ Generation Partnership Project; Technical Specification Group Radio Access Network; "Evolved Universal Terrestrial Radio Access Network; (E-UTRAN); X2 signalling transport" (Release 10).
3GPP TS 36.420 V 10.2.0 (Sep. 2011) $3^{rd}$ Generation Partnership Project; Technical Specification Group Radio Access Network; "Evolved Universal Terrestrial Radio Access Network; (E-UTRAN); X2 general aspects and princiles" (Release 10).
3GPP TS 36.300 V 10.5.0 (Sep. 2011) $3^{rd}$ Generation Partnership Project; Technical Specification Group Radio Access Network; "Evolved Universal Terrestrial Radio Access (E-UTRA) and Evolved Universal Terrestrial Radio Access Network"; (E-UTRAN); Overall description stage 2 (Release 10).
3GPP TS 36.331 V 10.3.0 (Sep. 2011) $3^{rd}$ Generation Partnership Project; Technical Specification Group Radio Access Network; "Evolved Universal Terrestrial Radio Access (E-UTRA); Radio Resource Control; Protocol Specification" (Release 10).
Extended European Search Report dated Jul. 16, 2015.
Ericsson: "X2 Mobility Between Macro and Open HeNBs". 3GPP Draft; R3-112595. 3rd Generation Partnership Project (3GPP). Mobile Competence Centre ; 650. Route Des Lucioles ; F-06921 Sophia-Antipolis Cedex ; France. vol. RAN WG3. No. Zhuhai; 20111010. Oct. 1, 2011. XP050542300. [retrieved on Oct. 1, 2011].
Samsung: "Clarification to ANR 1.4.9.1G Operation", 3GPP Draft; R3-102142 Clarification to ANR Operation. 3rd Generation Partnership-Project (3GPP). Mobile Competence Centre; 650. Route Des Lucioles ; F-06921 Sophia-Antipolis Cedex; France. vol. RAN WG3. No. Madrid. Spain; 20100823. Aug. 15, 2010. XP050453020. [retrieved on Aug. 15, 2010].
Japanese Office Action dated Jan. 12, 2016 with a partial English translation.
Ericsson, Alcatel-Lucent, "SCTP Concentrator: A Simple Solution to a Debated Problem" Dresden, Germany, Feb. 6-10, 2012 3GPP TSG-RAN WG3 #75, R3-120321, Jan. 31, 2012.
"Analysis of X2 GW Proxy for HeNB support" Intel San Francisco, CA USA, Nov. 14-18, 2011 3GPP TSG-RAN WG3 #74, R3-112920, Nov. 4, 2011.

* cited by examiner

| Parameter name | Value |
|---|---|
| eNB TYPE OF SELF-eNB | Macro eNB |
| eNB TYPE IN WHICH X2 LINK ESTABLISHMENT SHOULD BE RESTRICTED | Pico eNB, HeNB |

| Parameter name | Value |
|---|---|
| eNB TYPE OF SELF-eNB | Pico eNB |
| eNB TYPE IN WHICH X2 LINK ESTABLISHMENT SHOULD BE RESTRICTED | Macro eNB |

Fig. 4

X2 SETUP REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| eNB type | O | | ENUMERATED (Macro eNB, Micro eNB, Pico eNB, HeNB) | | YES | ignore |
| | | 1 to maxCellineNB | | | | |
| Served Cells | | | | Complete list of cells served by the eNB | YES | reject |
| ... | ... | | ... | ... | ... | ... |

X2 SETUP RESPONSE

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| eNB type | O | | ENUMERATED (Macro eNB, Micro eNB, Pico eNB, HeNB) | | YES | ignore |
| Served Cells | | 1 to maxCellineNB | | Complete list of cells served by the eNB | YES | reject |
| ... | ... | ... | ... | ... | ... | ... |

| Parameter name | Value |
|---|---|
| THE MAXIMUM NUMBER OF X2 LINKS | 100 |

Fig. 7

| OPPOSING eNB IN WHICH X2 LINK HAS BEEN ESTABLISHED | eNB type |
|---|---|
| eNB ID#1 | Pico eNB |
| eNB ID#2 | HeNB |
| eNB ID#3 | Macro eNB |
| eNB ID#4 | Macro eNB |
| eNB ID#5 | Pico eNB |
| eNB ID#6 | Macro eNB |
| . . . | . . . |

Fig. 8

X2 SETUP REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Number of user | O | | INTEGER (0..65535) | | YES | ignore |
| Served Cells | | 1 to maxCellineNB | | Complete list of cells served by the eNB | YES | reject |
| ... | ... | ... | ... | ... | ... | ... |

X2 SETUP RESPONSE

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Number of user | O | | INTEGER (0..65535) | | YES | ignore |
| Served Cells | | 1 to maxCellineNB | | Complete list of cells served by the eNB | YES | reject |
| ... | ... | ... | ... | ... | ... | ... |

312 → Number of user

Fig. 12

ENB CONFIGURATION UPDATE

| IE/Group Name | Presence | Range | IE type and reference | Semantics description | Criticality | Assigned Criticality |
|---|---|---|---|---|---|---|
| Message Type | M | | 9.2.13 | | YES | reject |
| Number of user | O | | INTEGER (0..65535) | | YES | ignore |
| Served Cells To Add | | 0 to maxCellineNB | | Complete list of added cells served by the eNB | GLOBAL | reject |
| ... | ... | ... | ... | ... | ... | ... |

| OPPOSING eNB IN WHICH X2 LINK HAS BEEN ESTABLISHED | THE NUMBER OF USERS |
|---|---|
| eNB ID#1 | 100 |
| eNB ID#2 | 10 |
| eNB ID#3 | 50 |
| eNB ID#4 | 150 |
| eNB ID#5 | 300 |
| eNB ID#6 | 200 |
| . . . | . . . |

Fig. 14

| Parameter name | Value |
|---|---|
| TIMER VALUE | 60sec |

| eNB ID | eNB type |
|---|---|
| eNB ID#1 | Macro eNB |
| eNB ID#2 | Micro eNB |
| eNB ID#3 | Pico eNB |
| eNB ID#4 | HeNB |
| ... | ... |

Cause

| IE/Group Name | Presence | Range | IE type and Reference | Semantics Description |
|---|---|---|---|---|
| CHOICE Cause Group | M | | | |
| >Radio Network Layer | | | | |
| ... | ... | ... | ... | ... |
| >Transport Layer | | | | |
| >>Transport Layer Cause | M | | ENUMERATED (Transport Resource Unavailable prohibited eNB Type, Unspecified ....) | |
| ... | ... | ... | ... | ... |

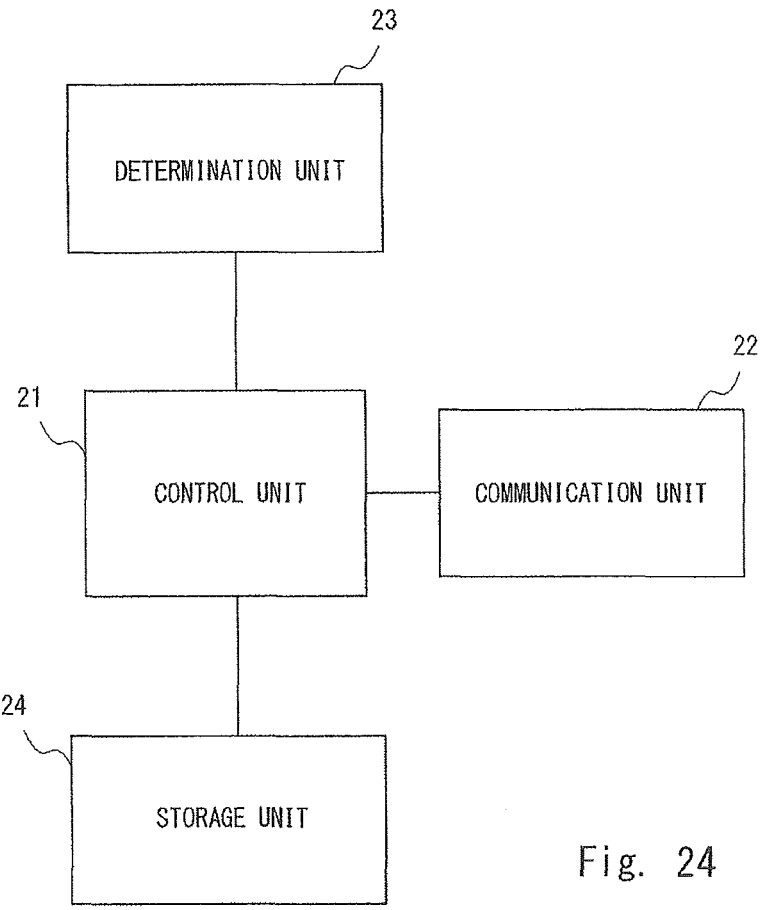

| eNB ID | eNB TYPE IN WHICH X2 LINK ESTABLISHMENT SHOULD BE RESTRICTED |
|---|---|
| eNB ID#1 | Pico eNB, HeNB |
| eNB ID#2 | HeNB |
| eNB ID#3 | Macro eNB |
| eNB ID#4 | Pico eNB |
| . . . | . . . |

Fig. 28

| eNB Type | eNB Type |
|---|---|
| Macro eNB | Pico eNB |
| Macro eNB | HeNB |
| Micro eNB | HeNB |

Fig. 29

RADIO BASE STATION, SERVER, MOBILE COMMUNICATION SYSTEM, AND OPERATION CONTROL METHOD

TECHNICAL FIELD

The present invention relates to a radio base station, a server, a mobile communication system, and an operation control method and, in particular, to control of a logical interface defined between radio base stations.

BACKGROUND ART

FIG. 32 is a sequence diagram of an X2 message exchanged between eNBs (Evolved Node Bs, radio base station apparatuses) in establishing a logical interface (an X2 interface) defined between the eNBs in a mobile communication network, specifically, a network of LTE (Long Term Evolution). Establishment of an X2 link (X2 interface) between an eNB (#1) 201 and an eNB (#2) 202 is performed as follows: either one transmits an X2 SETUP REQUEST message (step S112) and receives an X2 SETUP RESPONSE message from the other (step S113) (refer to Non Patent Literature 1).

The X2 link is set between the eNBs 201 and 202, whereby in UE (User Equipment, a mobile terminal) performing handover between the eNBs 201 and 202, the eNBs 201 and 202 exchange information using the X2 link, and thereby the handover can be achieved. If the X2 link does not exist, information exchange via an S1 interface is needed, and a time required for handover increases. In addition, burden of a core network also increases.

The logical X2 interface of an application layer is defined on an SCTP (Stream Control Transmission Protocol) (refer to Non Patent Literature 2), which is a transport layer (Non Patent Literatures 3 and 4). One SCTP association that is established in step S111 is used for one X2 link between the eNBs 201 and 202.

As one of SON (Self Organizing Network) functions that are discussed in 3GPP (3 rd Generation Partnership Project), there exists a function of an ANR (Automatic Neighbor Relation). It is one of the ANR functions that detects an eNB existing in a neighborhood, and that sets an X2 link with the neighboring eNB (refer to Non Patent Literature 5).

CITATION LIST

Non Patent Literature

Non patent literature 1: 3GPP TS 36.423
Non patent literature 2: RFC 4960
Non patent literature 3: 3GPP TS 36.422
Non patent literature 4: 3GPP TS 36.420
Non patent literature 5: 3GPP TS 36.300
Non patent literature 6: 3GPP TS 36.331

SUMMARY OF INVENTION

Technical Problem

By the above-mentioned ANR function, in a neighboring eNB being newly detected, it is expected to establish an X2 link with the eNB. However, there is a limit to the number of X2 links that can be set by one eNB, i.e., the number of SCTPs, in a real network, and it is impossible to set the X2 link with all the eNBs detected by the ANR function without limitation.

In addition, depending on a type of eNB, few users can be accommodated or a cell radius is small. There may be little advantage of establishing the X2 link with such eNB.

In setting the X2 link with the neighboring eNB detected by the ANR function, needed is a mechanism to control (select) establishment and disconnection of the X2 link using a certain logic.

An object of the present invention is to solve the above-mentioned problem, and to provide a radio base station, a server, a mobile communication system, and an operation control method that can suppress establishment of a useless logical interface.

Solution to Problem

A first exemplary aspect of the present invention is a radio base station of a mobile communication system including a determination means for determining whether it is proper or not to establish a logical interface with a neighboring radio base station by using a attribution information of the neighboring radio base station.

A second exemplary aspect of the present invention is an operation control method for a radio base station of a mobile communication system including a step of determining whether it is proper or not to establish a logical interface with a neighboring radio base station by using a attribution information of the neighboring radio base station.

A third exemplary aspect of the present invention is a server that is connected to radio base stations of a mobile communication system including a determination means for determining whether it is proper or not to establish a logical interface with a neighboring radio base station by using a attribution information of the neighboring radio base station.

A fourth exemplary aspect of the present invention is an operation control method for a server that is connected to radio base stations of a mobile communication system including a step of determining whether it is proper or not to establish a logical interface with a neighboring radio base station by using a attribution information of the neighboring radio base station.

A fifth exemplary aspect of the present invention is a mobile communication system including radio base stations and determination means for determining whether it is proper or not to establish a logical interface between the radio base stations by using a attribution information of the radio base stations.

A sixth exemplary aspect of the present invention is an operation control method for a mobile communication system including a step of determining whether it is proper or not to establish a logical interface with the radio base stations by using a attribution information of the radio base stations.

Advantageous Effects of Invention

According to the present invention, obtained is an advantageous effect capable of suppressing establishment of a useless logical interface.

BRIEF DESCRIPTION OF THE DRAWINGS

FIG. 4 is a database held by the eNB of FIG. 1. The Pico eNB is set to the database as a value of an eNB type of the self-eNB;

FIG. 5 is a table showing information elements added to an X2 SETUP REQUEST message;

FIG. 6 is a table showing information elements added to an X2 SETUP RESPONSE message;

FIG. 7 is a database held by the eNBs in the second embodiment of the present invention;

FIG. 8 is a database held by the eNBs in the second embodiment of the present invention;

FIG. 11 is a table showing information elements added to an X2 SETUP REQUEST message in the third embodiment of the present invention;

FIG. 12 is a table showing information elements added to an X2 SETUP RESPONSE message in the third embodiment of the present invention;

FIG. 13 is a table showing information elements added to an ENB CONFIGURATION UPDATE message in the third embodiment of the present invention;

FIG. 14 is a database held by the eNB in the third embodiment of the present invention;

FIG. 22 is a table showing elements added to Cause included in an X2 SETUP FAILURE message in the fourth embodiment of the present invention;

FIG. 24 is a diagram showing a configuration of the management server 150 of FIG. 23;

FIG. 25 is a database held by the management server in the fifth embodiment of the present invention;

FIG. 28 is a database held by the management server in the sixth embodiment of the present invention;

FIG. 29 is a database held by the management server in the sixth embodiment of the present invention;

DESCRIPTION OF EMBODIMENTS

Hereinafter, embodiments of the present invention will be explained with reference to drawings. First, a summary of a mobile communication system according to the present invention will be explained. The mobile communication system according to the present invention includes radio base stations, and further includes determination means for determining propriety of establishment of a logical interface between radio base stations based on attribution information of the radio base stations. Since the determination means determines the propriety of establishment of the logical interface between the radio base stations based on the attribution information of the radio base stations, establishment of a useless logical interface (a logical interface with low need for maintenance) can be suppressed.

Figure 1:
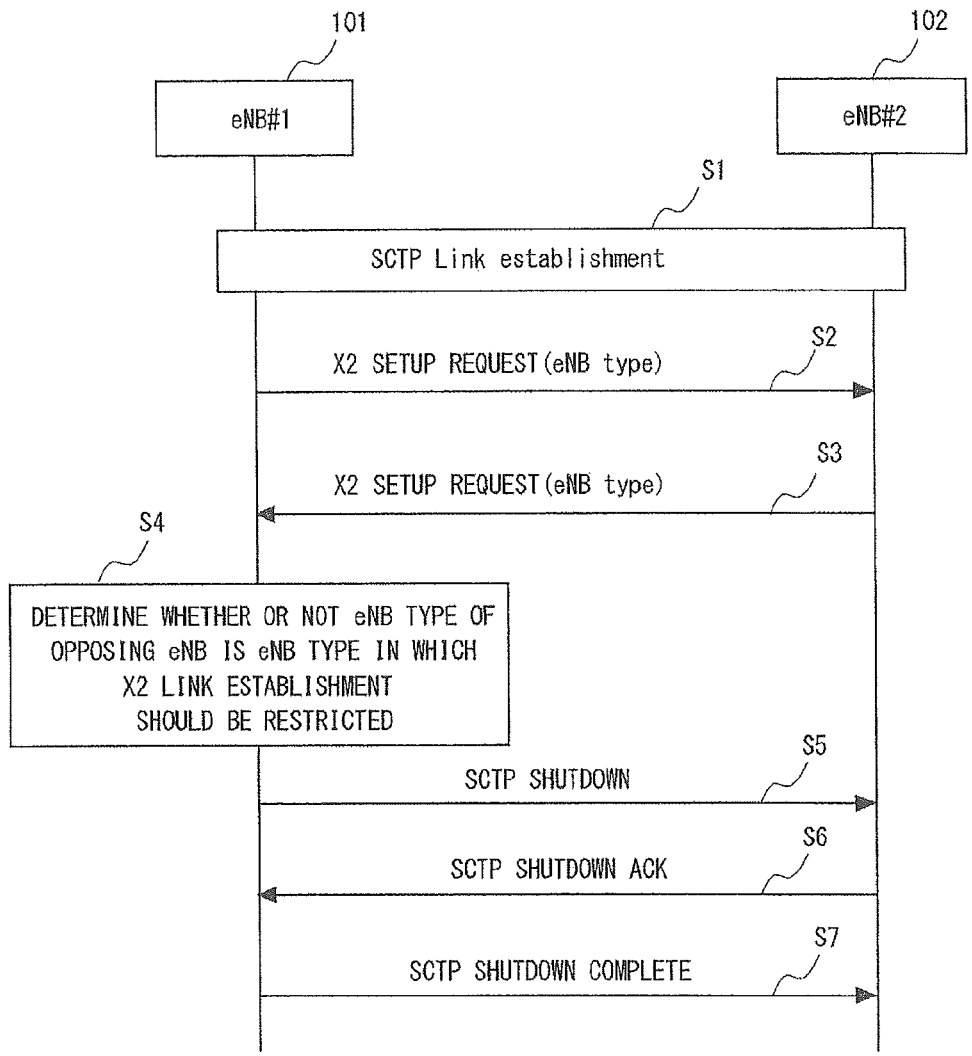
FIG. 1 is a sequence diagram showing operation of eNBs in a mobile communication system according to a first embodiment of the present invention.

FIG. 1 is a sequence diagram showing operation of eNBs in a mobile communication system according to a first embodiment of the present invention. An eNB (#1) 101 and an eNB (#2) 102 are radio base station apparatuses of LTE.

Figures 2, 3:
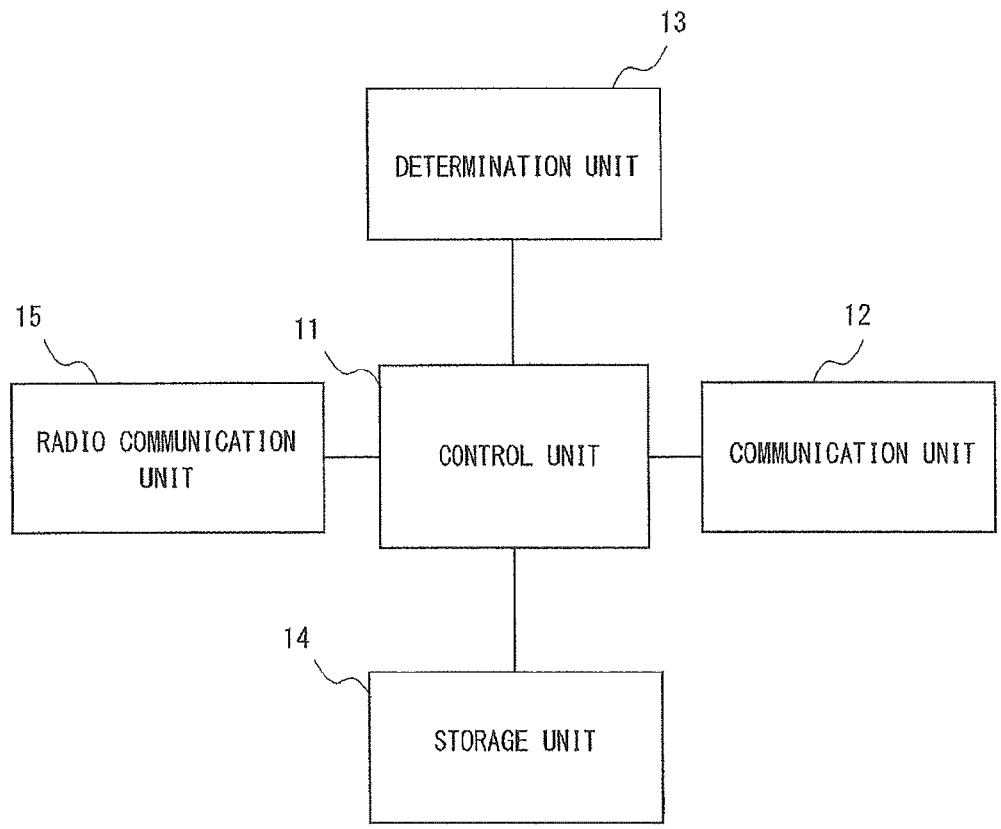
FIG. 2 is a diagram showing a configuration of the eNB of FIG. 1.
FIG. 3 is a database held by the eNB of FIG. 1.

FIG. 2 is a diagram showing a configuration of the eNB 101 of FIG. 1, and the eNB 102 also has an equivalent configuration. A determination unit 13 determines propriety of establishment of an X2 link with a neighboring eNB based on an eNB type of the neighboring eNB. A control unit 11 transmits and receives a message to/from the neighboring eNB using a communication unit 12. In addition, the control unit 11 performs control for disconnecting the X2 link in accordance with a determination result of the determination unit 13. A storage unit 14 includes various databases, which will be mentioned later. A radio communication unit 15 performs communication with UE, which is not shown.

FIG. 3 is a database held by the eNB 101 of FIG. 1. A value called a Macro eNB is set to the database as a value of an eNB type of the self-eNB. That is, the eNB 101 having the database is the Macro eNB. As values that eNB types can take, the Macro eNB, a Micro eNB, a Pico eNB, and an HeNB (Home eNB) are assumed.

In addition, the Pico eNB and the HeNB are set to the database as values of eNB types in which establishment of the X2 link should be restricted. As the values that can be taken here, in addition to four types of the Macro eNB, the Micro eNB, the Pico eNB, and the HeNB, values obtained by freely combining each of them can be employed (the Macro eNB+the Pico eNB, the Macro eNB+the Pico eNB+ the HeNB, etc.).

FIG. 4 is a database held by the eNB 102 of FIG. 1. The Pico eNB is set to the database as a value of an eNB type of the self-eNB. That is, the eNB 101 has the Macro eNB, whereas the eNB 102 has the Pico eNB. In addition, the Macro eNB is set as a value of an eNB type in which establishment of the X2 link should be restricted in the eNB 102.

FIG. 5 is a table showing information elements added to an X2 SETUP REQUEST message. An IE (Information Element) called an eNB type 301 is newly defined in an X2 SETUP REQUEST message described in 9.1.2.3 of Non Patent Literature 1. The Macro eNB, the Micro eNB, the Pico eNB, and the HeNB can be set as a range of the IE that indicates the eNB type, FIG. 6 is a table showing information elements added to an X2 SETUP RESPONSE message. An IE called an eNB type 302 is newly defined in an X2 SETUP RESPONSE message described in 9.1.2.4 of Non Patent Literature 1. The Macro eNB, the Micro eNB, the Pico eNB, and the HeNB can be set as a range of the IE that indicates the eNB type.

Hereinafter, with reference to FIG. 1, will be explained operation in the eNB 101 detecting the eNB 102 by means of an ANR function and trying to establish an X2 link.

Establishment of an SCTP link is performed between the eNBs 101 and 102 (step S1). Since an SCTP procedure used in this case is well known by Non Patent Literature 2, etc., details thereof are omitted. When the SCTP link is established, the eNB 101 transmits an X2 SETUP REQUEST message to the eNB 102 (step S2). In this case, the message including an eNB type of the self-eNB 101 is transmitted as shown in FIG. 5. This eNB type coincides with the eNB type of the self-eNB shown in FIG. 3.

When receiving the X2 SETUP REQUEST message, the eNB 102 transmits an X2 SETUP RESPONSE message (step S3). In this case, the message including an eNB type of the self-eNB 102 is transmitted as shown in FIG. 6. This eNB type coincides with the eNB type of the self-eNB shown in FIG. 4.

The eNB 101 determines propriety of establishment of the X2 link with the eNB 102 based on the eNB type of the opposing eNB 102 included in the X2 SETUP RESPONSE message (step S4). The eNB 101 confirms whether or not the eNB type of the eNB 102 is included in the eNB types of FIG. 3 in which establishment of the X2 link should be restricted. Since the eNB type of the eNB 102 is included in the example, disconnection of the SCTP link is started.

Although SCTP link disconnection operation is described in Non Patent Literature 2, it will be explained hereinafter. The eNB 101 transmits an SCTP SHUTDOWN message in order to disconnect the SCTP link (step S5). When receiving the SCTP SHUTDOWN message, the eNB 102 returns an SCTP SHUTDOWN ACK message (step S6). The eNB 101 transmits an SCTP SHUTDOWN COMPLETE message, and disconnection of the SCTP link is completed (step S7). Instead of the above disconnection procedure, the eNB 101 transmits an SCTP ABORT message to the eNB 102, and also thereby disconnection can be made.

In step S4, when the eNB type of the eNB 102 is not included in the eNB types in which establishment of the X2 link should be restricted, the eNB 101 does not perform disconnection of the SCTP link in order to maintain the X2 link.

Although in the above explanation, the eNB 101 determines the propriety of establishment of the X2 link after the X2 link is established (the X2 SETUP REQUEST/RESPONSE are exchanged), the eNB 102 may determine the propriety of establishment of the X2 link with the eNB 101 in response to reception of the X2 SETUP REQUEST message. In this case, the eNB 102 confirms whether or not the eNB type of the eNB 101 included in the X2 SETUP REQUEST message is included in the eNB type of FIG. 4 in which establishment of the X2 link should be restricted, and thereby determines the propriety of establishment of the X2 link. Then, if included, the eNB 102 does not establish the X2 link by returning to the eNB 101 an X2 SETUP FAILURE message instead of the X2 SETUP RESPONSE message.

In addition, although in the above explanation, propriety determination of establishment of the X2 link is performed based on the eNB type of the eNB, determination criterion is not limited to the eNB type, and various attribution information of the eNB can be used. For example, may be used: a cell radius of the eNB (for example, values, such as a Very Large, a Large, a Medium, and a Small, are taken); the number of users that can be accommodated by the eNB; the number of users of the eNB (the number of users having been in a service area of a cell of the eNB (the number of UE of an IDLE MODE and a CONNECTED MODE, refer to Non Patent Literature 6 for details of the each mode)); a load condition of the eNB (for example, values, such as a High load, a medium load, and a low load, are taken); and a cell radius of the eNB (unlike the above-mentioned cell radius, it is represented by means of a Reference signal power (dBm) of the eNB). When the number of users that can be accommodated by the eNB, the number of users, and the Reference signal power (dBm) are used, the propriety determination of establishment of the X2 link is performed by comparing values of the above attribution information with predetermined threshold values (if the values are smaller than the threshold values, the X2 link is disconnected).

As explained above, in the first embodiment of the present invention, the eNBs 101 and 102 mutually exchange their own eNB types in the establishment of the X2 link, and additionally, the each eNB determines the propriety of establishment of the X2 link based on the eNB type of the opposing eNB. Accordingly, since each eNB can select whether to establish the X2 link according to the eNB type of the opposing eNB, it becomes possible to save resources for the X2 link/SCTP link.

Next, a second embodiment of the present invention will be explained. Although in the first embodiment of the present invention, the propriety of establishment of the X2 link is determined in every establishment of the X2 link, in the second embodiment of the present invention, determination is not performed in every establishment of the X2 link, but the propriety of establishment of the established X2 link is determined when the number of established X2 links reach a predetermined value. It is to be noted that a basic configuration of the second embodiment of the present invention is the same as that of the first embodiment of the present invention, and that the eNBs 101 and 102 hold the databases of FIGS. 3 and 4, respectively also in the second embodiment of the present invention. In addition, in establishing the X2 link between the eNBs 101 and 102, the eNBs 101 and 102 mutually exchange the eNB types of the self-eNBs as in steps S2 and S3 of FIG. 1.

FIGS. 7 and 8 are databases held by the eNBs in the second embodiment of the present invention. In the database of FIG. 7, the number 100 is set as the maximum number of X2 links (an upper limit of the number of established X2 links/SCTP links) of the self-eNB. In the database of FIG. 8, stored are identifiers (eNB IDs) and eNB type information of opposing eNBs in which X2 links have been established with the self-eNB. Notification of the eNB IDs and the eNB type information of the opposing eNBs is, as mentioned above, performed from the opposing eNBs in the establishment of the X2 links. Whenever establishing and disconnecting the X2 link, the eNB updates the database of FIG. 8.

Figure 9:
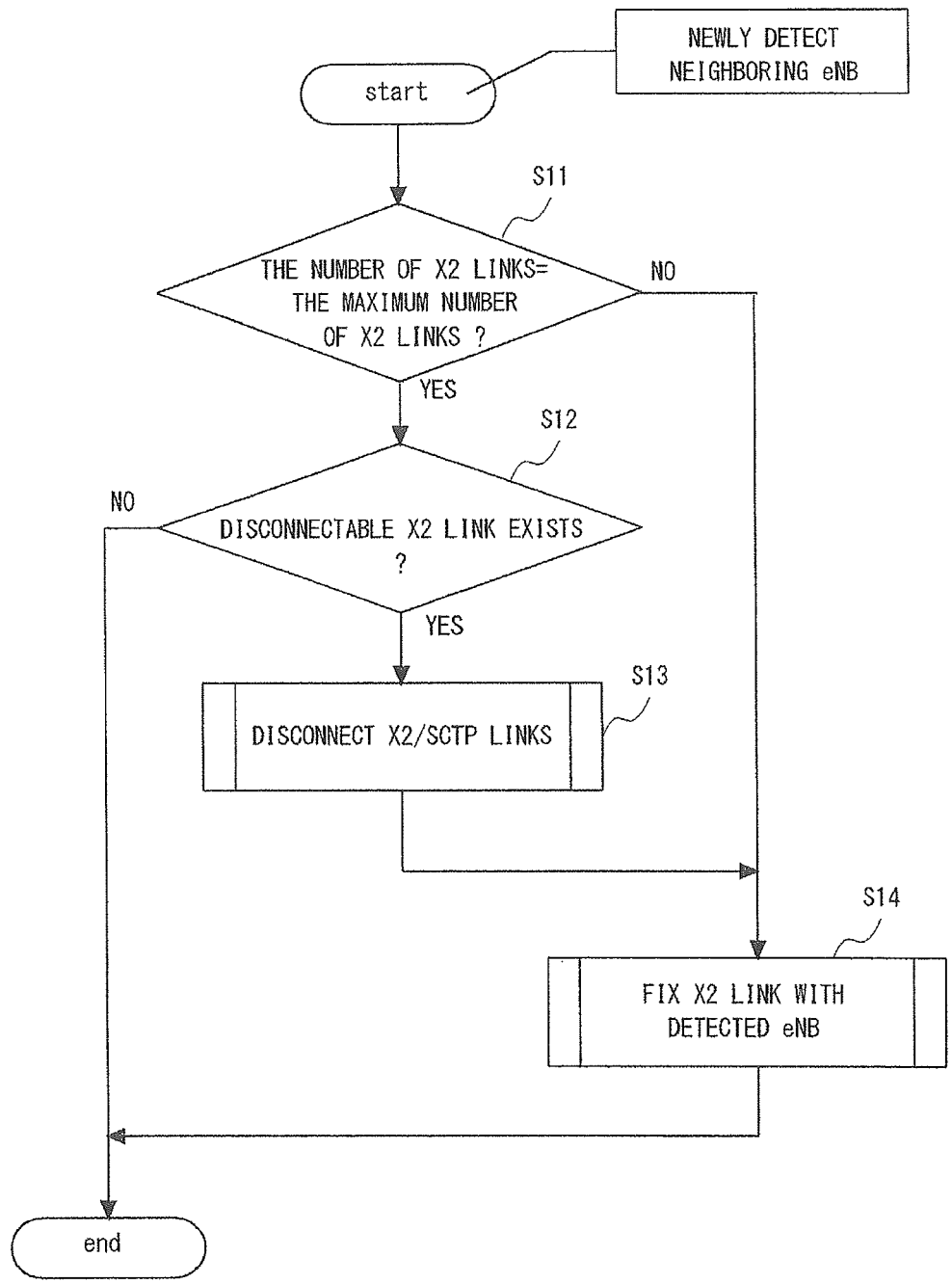
FIG. 9 is a flow chart showing operation of the eNB in the second embodiment of the present invention.

FIG. 9 is a flow chart showing operation of the eNB in the second embodiment of the present invention. Hereinafter, with reference to FIG. 9, will be explained operation in the eNB 101 detecting the eNB 102 by means of the ANR function.

The eNB 101 confirms whether or not the number of established X2 links of the eNB 101 is the same as the maximum number of X2 links of FIG. 7 (step S11).

If it reaches the maximum number of X2 links, the eNB 101 determines propriety of establishment of the established X2 links based on the eNB types of the database of FIG. 8, and confirms presence/absence of the disconnectable X2 links (step S12). Namely, in the database of FIG. 8, searched are the eNB types included in the eNB types of FIG. 3 (in this case, the Pico eNB, the HeNB) in which establishment of the X2 link should be restricted. In FIG. 8, the established X2 links with an eNB ID#1, an eNB ID#2, and an eNB ID#5 are selection objects as the disconnectable X2 links.

The eNB 101 then disconnects the disconnectable X2 links (step S13). Namely, a sequence of steps S5 to S7 of FIG. 1 is carried out. When the plurality of X2 links exist as the selection objects, the eNB 101 may disconnect the arbitrary X2 link(s), or may disconnect all of them. When the number of established X2 links does not reach the maximum number of X2 links after step S13 or in step S11, the eNB 101 establishes an X2 link with the detected eNB 102 (step S14).

Although in the above explanation, propriety determination of establishment of the X2 links in step S12 is performed based on the eNB types of the eNBs, similarly to the first embodiment of the present invention, determination criterion is not limited to the eNB types, and various attribution information of the eNBs can be used. When the number of users that can be accommodated by the eNB, the number of users, and the Reference signal power (dBm) are used, the eNB 101 may perform propriety determination by comparing values of the above attribution information with predetermined threshold values, or may disconnect the established X2 link with the eNB having a lowest value.

As explained above, since in the second embodiment of the present invention, establishing the X2 links also with the eNBs of the eNB types in which establishment of the X2 link should be restricted until the number of established X2 links reaches the upper limit, and determining the propriety of establishment of the established X2 links when the number of established X2 links reaches the upper limit, the eNB 101 can disconnect the useless X2 links to establish an X2 link with a newly detected neighboring eNB, even when the number of established X2 links reaches the upper limit.

Next, a third embodiment of the present invention will be explained. Although in the first and second embodiments of the present invention, notification of attribution information of the opposing eNB is performed only in the X2 link being established between the eNBs 101 and 102, in the third embodiment of the present invention, each eNB regularly notifies of attribution information of the self-eNB an eNB in which an X2 link has been established with the self-eNB in consideration of a case where the attribution information, notification of which is performed, dynamically changes. It is to be noted that although a basic configuration of the third embodiment of the present invention is the same as that of the first embodiment of the present invention, in the following explanation, the number of users of the eNB (the number of users having been in the service area of the cell of the eNB) is used instead of the eNB type, and thus the eNBs 101 and 102 need not hold the databases of FIGS. 3 and 4, respectively. In addition, each of the eNBs 101 and 102 holds the database of FIG. 7.

Figure 10:
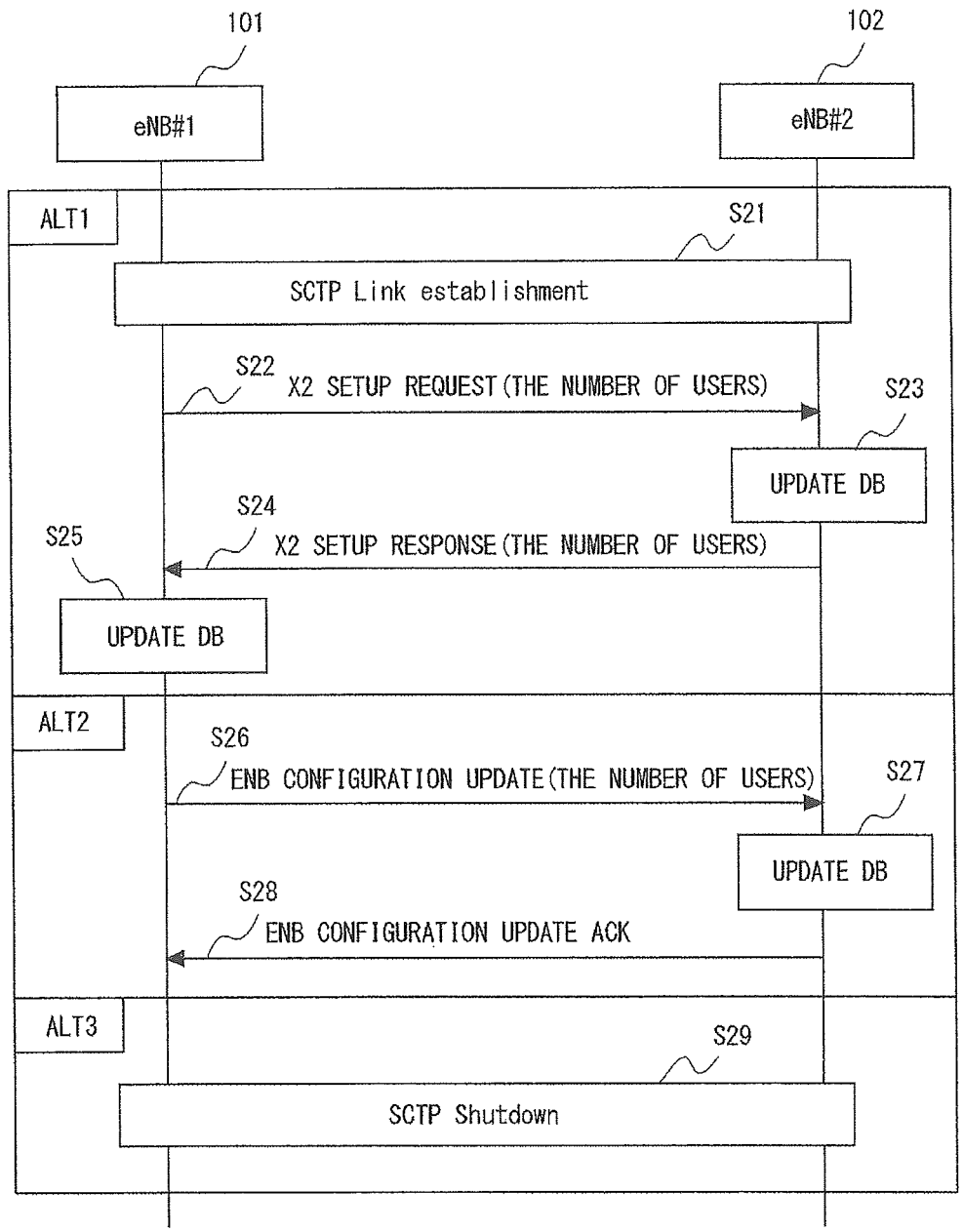
FIG. 10 is a sequence diagram showing operation of the eNBs in the third embodiment of the present invention.

FIG. 10 is a sequence diagram showing operation of the eNBs in the third embodiment of the present invention. Notification of the number of users is performed using an X2 message. In an ALT 1, shown is operation of exchanging information of the number of users between the eNBs 101 and 102 at the time of establishment of the X2 link. In an ALT 2, shown is operation of notifying the opposing eNB of the information of the number of users of the self-eNB on an established X2 link using an ENB CONFIGURATION UPDATE message. In an ALT 3, operation of disconnecting the X2 link/SCTP link is shown. An opportunity of the each ALT will be mentioned later.

FIG. 11 is a table showing information elements added to an X2 SETUP REQUEST message in the third embodiment of the present invention. Unlike FIG. 5, an IE called a Number of users (the number of users) 311 is specified in FIG. 11. FIG. 12 is a table showing information elements added to an X2 SETUP RESPONSE message in the third embodiment of the present invention. Unlike FIG. 6, an IE called a Number of users 312 is specified in FIG. 12. The eNBs 101 and 102 can know the mutual number of users by exchanging the messages of FIGS. 11 and 12 at the time of establishment of the X2 link.

FIG. 13 is a table showing information elements added to an ENB CONFIGURATION UPDATE message in the third embodiment of the present invention. An IE called a Number of users 313 is newly specified in the ENB CONFIGURATION UPDATE message described in 9.1.2.8 of Non Patent Literature 1. The eNBs 101 and 102 transmit this message on the X2 link, and thereby can inform the opposing eNB of the information of the number of users of the self-eNB.

It is to be noted that although the Number of users (the number of users) specified in FIGS. 11 to 13 is, as mentioned above, the number of users having been in the service area of the cell of the self-eNB (the number of UE of the IDLE MODE and the CONNECTED MODE, refer to Non Patent Literature 6 for details of the each mode), may be employed a method for notifying of the number of users of the IDLE MODE and the CONNECTED MODE by means of different parameters, respectively. In addition, since it is also considered that one eNB has a plurality of cells, in that case, the number of users for each cell may be specified.

FIG. 14 is a database held by the eNB in the third embodiment of the present invention. In the database of FIG. 14, stored are identifiers (eNB IDs) and information of the number of users of opposing eNBs in which X2 links have been established with the self-eNB. Newest information of the number of users received for each eNB is recorded. The number of users, 10 is shown in an eNB ID#2, and it is the smallest number of users.

Figures 15, 16:
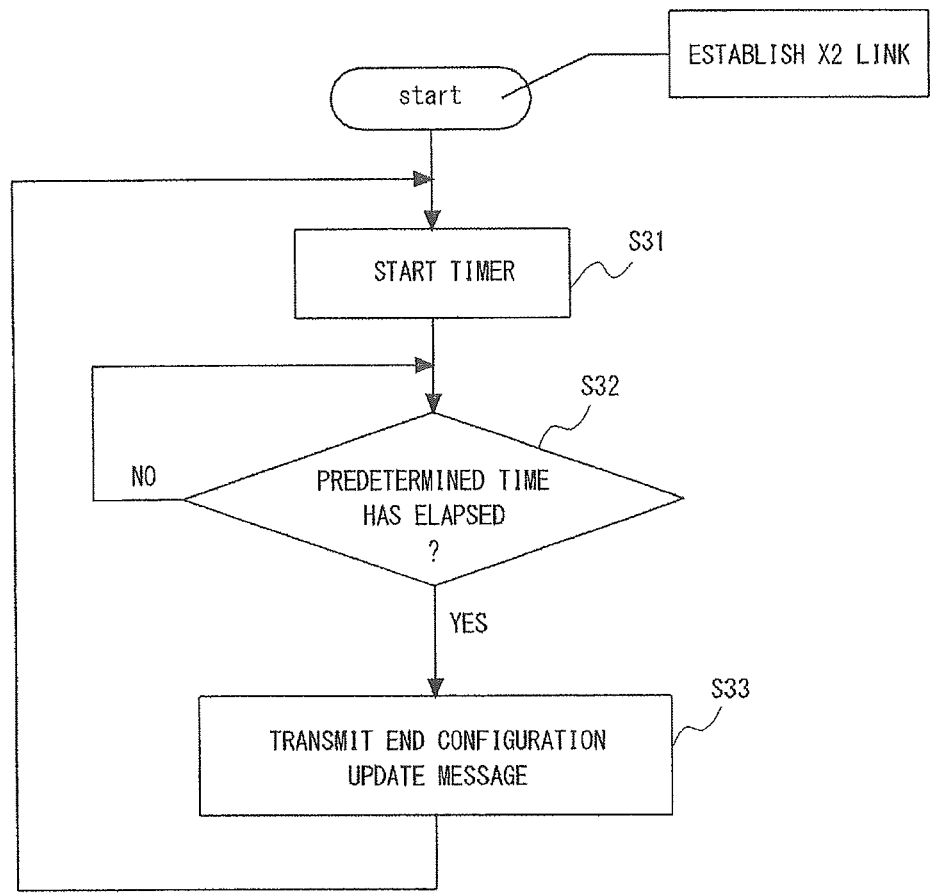
FIG. 15 is a flow chart showing operation of the eNB after establishment of an X2 link in the third embodiment of the present invention.
FIG. 16 is a database held by the eNB in the third embodiment of the present invention.

FIG. 15 is a flow chart showing operation of the eNB after establishment of an X2 link in the third embodiment of the present invention. When establishing the X2 link with the opposing eNB, the eNB starts timekeeping by means of a timer, which is not shown (step S31), and when a predetermined time elapses (step S32), the eNB notifies of the opposing eNB an ENB CONFIGURATION UPDATE message including the number of users (step S33). The above operation is repeated during establishment of the X2 link with the opposing eNB, and thereby the ENB CONFIGURATION UPDATE message is regularly transmitted to the opposing eNB. From this, a database can be updated in the opposing eNB. It is to be noted that step S33 of FIG. 15 corresponds to step S26 of FIG. 10.

FIG. 16 is a database held by the eNB in the third embodiment of the present invention. In the database, a timer value of the timer explained in FIG. 15 is specified. In this case, the timer value is set as 60 seconds. That is, notification of the information of the number of users of the self-eNB is performed to the opposing eNB after elapse of 60 seconds.

Figure 17:
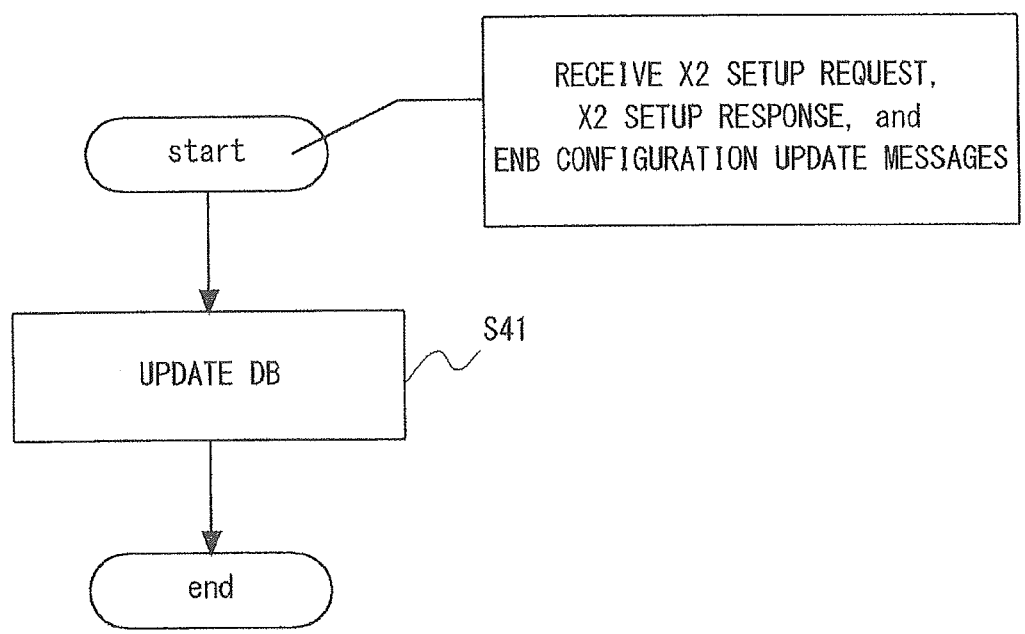
FIG. 17 is a flow chart showing operation of the eNB in information of the number of users being received in the third embodiment of the present invention.

FIG. 17 is a flow chart showing operation of the eNB in information of the number of users being received in the third embodiment of the present invention. When receiving an X2 SETUP REQUEST message, an X2 SETUP RESPONSE message, and an ENB CONFIGURATION UPDATE message from an opposing eNB, the eNB updates the database of FIG. 14 held by the self-eNB (step S41). It is to be noted that step S41 of FIG. 17 corresponds to steps S23, S25, and S27 of FIG. 10. After steps S23 and S27 of FIG. 10, the eNB 102 transmits to the eNB 101 the X2 SETUP RESPONSE message of step S24 and an ENB CONFIGURATION UPDATE ACK message of step S28, respectively.

Figure 18:
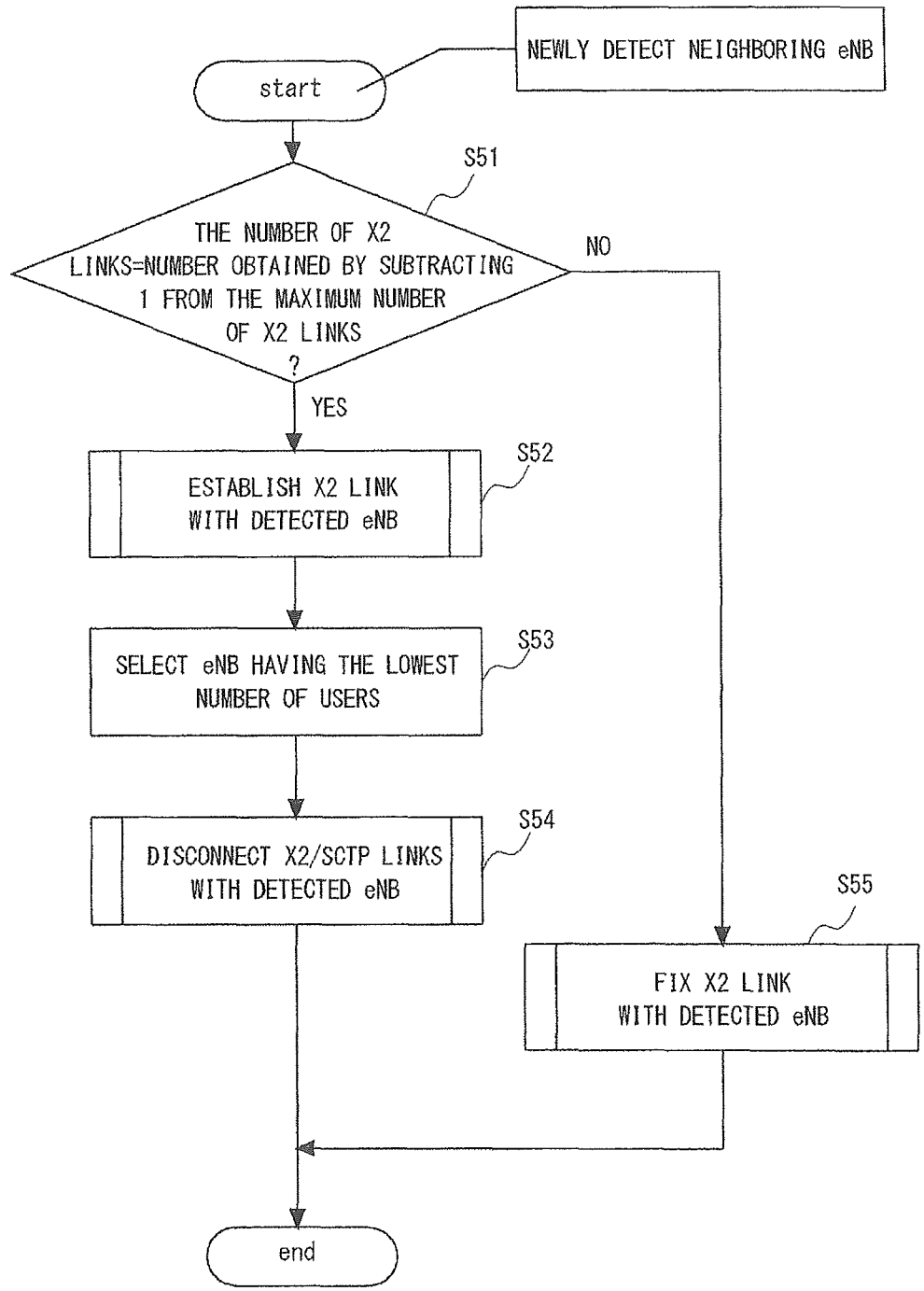
FIG. 18 is a flow chart showing operation of the eNB in a neighboring eNB being newly detected in the third embodiment of the present invention.

FIG. 18 is a flow chart showing operation of the eNB in a neighboring eNB being newly detected in the third embodiment of the present invention. When detecting the eNB 102 by means of the ANR function, the eNB 101 confirms whether or not the number of established X2 links of the eNB 101 reaches a number obtained by subtracting 1 from the maximum number of X2 links of FIG. 7 (step S51). If the number of established X2 links of the eNB 101 reaches the number obtained by subtracting 1 from the maximum number of X2 links, the eNB 101 establishes an X2 link with the detected eNB 102 (step S52). It is to be noted that step S52 of FIG. 18 corresponds to steps S21 to S25 of FIG. 10.

Next, the eNB 101 determines propriety of establishment of the established X2 links based on the information of the number of users of the database of FIG. 14, and selects the X2 link that should be disconnected (step S53). Here, selected is the neighboring eNB having the lowest number of users in the database of FIG. 14. The eNB 101 then disconnects the established X2 link with the selected eNB (step S54). It is to be noted that step S54 of FIG. 18 corresponds to the SCTP link disconnection operation of step S29 of FIG. 10. When the number of established X2 links does not reach the number obtained by subtracting 1 from the maximum number of X2 links in step S51, the eNB 101 establishes the X2 link with the detected eNB 102 similarly to step S52 (step S55).

Although in the above explanation, propriety determination of establishment of the X2 links in step S53 is performed based on the number of users of the eNB, determination criterion is not limited to the number of users, and various attribution information of the eNB can be used. For example, may be used the cell radius of the eNB (for example, values, such as the Very Large, the Large, the Medium, and the Small, are taken); the number of users that can be accommodated by the eNB; the load condition of the eNB (for example, values, such as the High load, the medium load, and the low load, are taken); and the cell radius of the eNB (unlike the above-mentioned cell radius, it is represented by means of the Reference signal power (dBm) of the eNB).

As explained above, in the third embodiment of the present invention, the eNB 101 establishes the X2 link with the neighboring eNB until the number of established X2 links reaches the number obtained by subtracting 1 from the maximum number of X2 links, and when the number of established X2 links reaches the number obtained by subtracting 1 from the maximum number of X2 links, the eNB 101 determines the propriety of establishment of the established X2 links, and can disconnect the useless X2 link. In addition, since each eNB regularly notifies of the attribution information of the self-eNB the eNB in which the X2 link has been established with the self-eNB, the third embodiment of the present invention is more suitable than a case of using dynamically changing information, such as the number of users, for the propriety determination of establishment of the X2 link.

Next, a fourth embodiment of the present invention will be explained. Although in the first to third embodiments of the present invention, propriety of establishment of the X2 link is determined based on the attribution information of the eNB acquired via the X2 link, in the fourth embodiment of the present invention, each eNB holds a database in which attribution information of each of the eNBs in the mobile communication system is previously stored, and determines propriety of establishment of an X2 link using the database. It is to be noted that although a basic configuration of the fourth embodiment of the present invention is the same as that of the first embodiment of the present invention, the above-described databases are used in the following explanation, and thus the eNBs 101 and 102 need not hold the databases of FIGS. 3 and 4, respectively.

Figure 19:
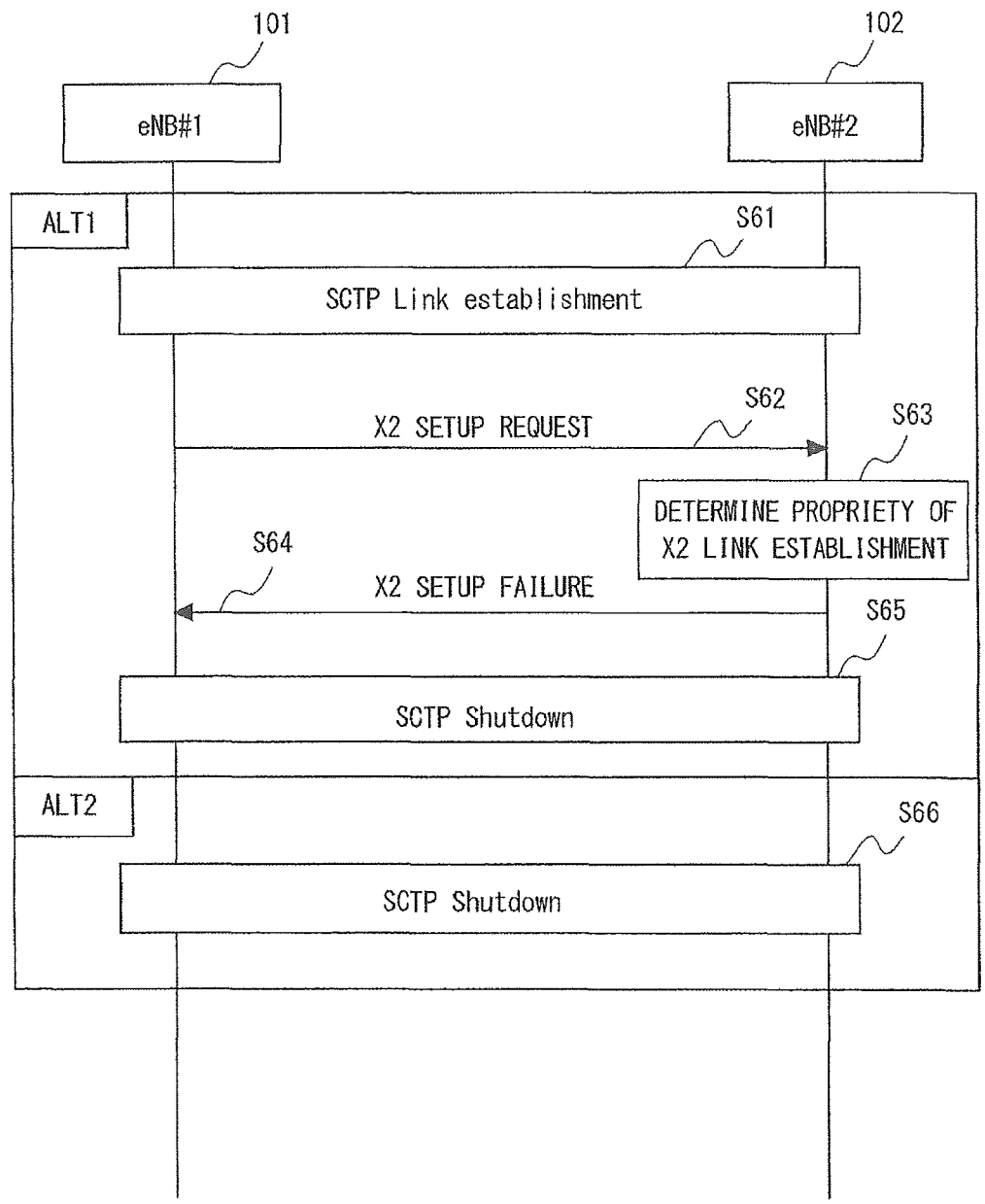
FIG. 19 is a sequence diagram showing operation of the eNBs in the fourth embodiment of the present invention.
Figures 20, 21:
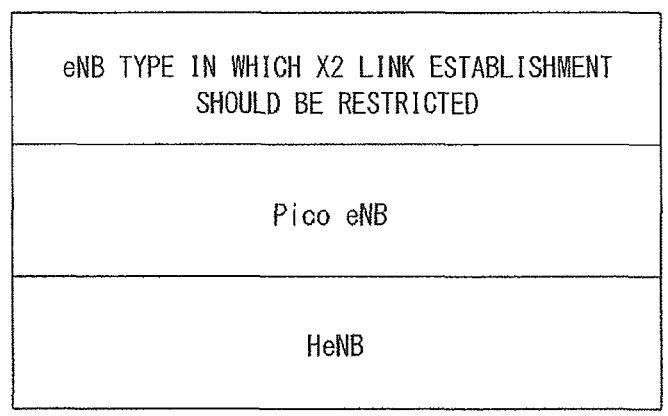
FIG. 20 is a database held by the eNB in the fourth embodiment of the present invention.
FIG. 21 is a database held by the eNB in the fourth embodiment of the present invention.

FIG. 19 is a sequence diagram showing operation of the eNBs in the fourth embodiment of the present invention. FIGS. 20 and 21 are databases held by the eNB in the fourth embodiment of the present invention. In the database of FIG. 20, previously stored are an identifier (eNB ID) of each of eNBs in the mobile communication system and an eNB type thereof. In the database of FIG. 21, registered are the eNB types in which establishment of the X2 link should be restricted.

FIG. 22 is a table showing elements added to Cause included in an X2 SETUP FAILURE message in the fourth embodiment of the present invention. In Cause described in 9.2.6 of Non Patent Literature 1, a cause called a "prohibited eNB Type" is added in >>Transport Layer Cause.

Hereinafter, with reference to FIG. 19, will be explained operation in the eNB 101 detecting the eNB 102 by means of the ANR function and trying to establish an X2 link.

Establishment of an SCTP link is performed between the eNBs 101 and 102 (step S61). The eNB 101 transmits an X2 SETUP REQUEST message to the eNB 102 (step S62). This message does not include eNB type information.

When receiving the X2 SETUP REQUEST message, the eNB 102 determines propriety of establishment of the X2 link with the eNB 101 using the holding database (step S63). Namely, the eNB 102 acquires an eNB type of the eNB 101 from the database of FIG. 20 held by the eNB 102 based on an eNB ID of the source eNB 101 included in the X2 SETUP REQUEST message. In addition, the eNB 102 refers to the database of FIG. 21 that the eNB 102 has, and confirms whether or not the eNB type of the eNB 101 is included in the eNB types in which establishment of the X2 link should be restricted.

If in step S63, the eNB type of the eNB 101 falls under the eNB types in which establishment of the X2 link should be restricted, the eNB 102 transmits the X2 SETUP FAILURE message to the eNB 101 in order to reject the establishment of the X2 link (step S64). In this case, it is necessary to include Cause in the X2 SETUP FAILURE message, and Cause shown in FIG. 22 is proposed as new Cause. It is to be noted that if in step S63, the eNB type of the eNB 101 does not fall under the eNB types in which establishment of the X2 link should be restricted, the eNB 102 transmits an X2 SETUP RESPONSE message to the eNB 101, and establishes the X2 link.

After step S64, the eNB 102 can start disconnection of the SCTP link to release a resource of a transport layer between the eNB 101 and the eNB 102 itself (step S65). The eNB 101 may start disconnection of the SCTP link.

The databases of FIGS. 20 and 21 are updated when an operator changes a policy (for example, an eNB type that has not been registered until now is added to the database of FIG. 21), when a value is input to the each database for the first time, etc. Taking the opportunity of such update of the databases of FIGS. 20 and 21, when there exists an established X2 link with an eNB of the eNB type in which establishment of the X2 link should be restricted, disconnection of the SCTP link may be started in order to disconnect the X2 link (step S66).

Although in the above explanation, the eNB 102 that has received the X2 SETUP REQUEST message determines the propriety of establishment of the X2 link in step S63, in the eNB 101 detecting the eNB 102 by means of the ANR function and trying to establish the X2 link, the eNB 101 may determine the propriety of establishment of the X2 link with the detected eNB 102 using the databases of FIGS. 20 and 21 held by the self-eNB 101. Here, if an eNB type of the eNB 102 falls under the eNB types in which establishment of the X2 link should be restricted, the eNB 101 does not transmit the X2 SETUP REQUEST message to the eNB 102 or does not establish an SCTP link with the eNB 102, or when the SCTP link, has been already established with the eNB 102, the eNB 101 can start disconnection of the SCTP link.

In addition, although in the above explanation, propriety determination of establishment of the X2 link is performed based on the eNB type of the eNB, similarly to the other embodiments of the present invention, determination criterion is not limited to the eNB type, and various attribution information of the eNB can be used.

As explained above, in the fourth embodiment of the present invention, each eNB holds the database in which the eNB type of each of the eNBs in the mobile communication system is previously stored, and determines the propriety of establishment of the X2 link based on the eNB type of the opposing eNB acquired from the database. Accordingly, since each eNB can select whether to establish the X2 link according to the eNB type of the opposing eNB, it becomes possible to save resources for the X2 link/SCTP link.

It is to be noted that although in the fourth embodiment of the present invention, propriety of establishment of an X2 link with a neighboring eNB whenever the neighboring eNB is detected by the ANR function, the propriety of establishment of the established X2 links may be determined only when the number of established X2 links reaches a predetermined value as in the second embodiment of the present invention.

In this case, each eNB is provided with the database of FIG. 7 in addition to the databases of FIGS. 20 and 21. Additionally, in detecting the neighboring eNB by means of the ANR function, the eNB may just perform similar operation to the flow chart of FIG. 9. However, in step S12 of FIG. 9, propriety of establishment of the established X2 links is determined using the databases of FIGS. 20 and 21.

Next, a fifth embodiment of the present invention will be explained. Although in the fourth embodiment of the present invention, each eNB holds the database in which attribution information of each of the eNBs in the mobile communication system is previously stored, in the fifth embodiment of the present invention, a server different from the eNB is made to hold a database, and the server determines propriety of establishment of an X2 link in each eNB using the database.

Figure 23:
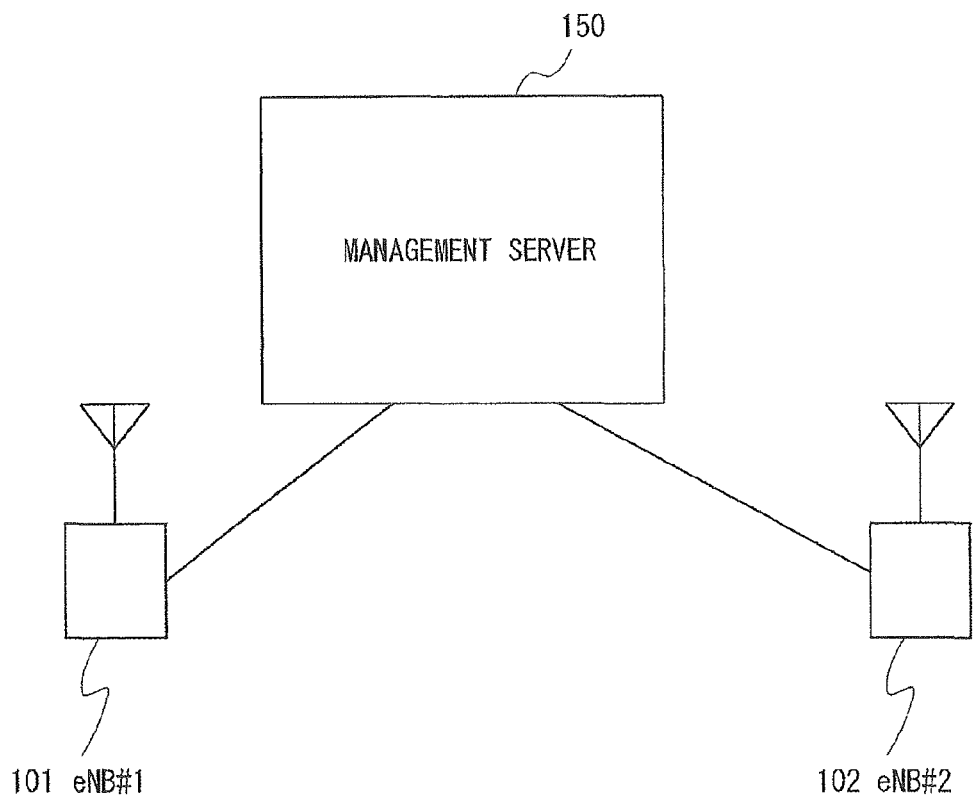
FIG. 23 is a diagram showing a configuration of a mobile communication system according to the fifth embodiment of the present invention.

FIG. 23 is a diagram showing a configuration of a mobile communication system according to the fifth embodiment of the present invention. As shown in FIG. 23, there exist the eNBs 101 and 102 in the fifth embodiment of the present invention similarly to the first to fourth embodiments of the present invention. The fifth, embodiment is different from the first to fourth embodiments of the present invention in a point where the eNBs 101 and 102 are connected to a management server 150.

FIG. 24 is a diagram showing a configuration of the management server 150 of FIG. 23. A determination unit 23 determines propriety of establishment of an X2 link between eNBs based on eNB types of the eNBs. A control unit 21 performs communication with the eNBs using a communication unit 22. A storage unit 24 includes various databases, which will be mentioned later.

FIG. 25 is a database held by the management server 150 in the fifth embodiment of the present invention. In the database of FIG. 25, previously registered are an identifier (eNB ID) of each of eNBs in the mobile communication system, an eNB type thereof, and eNB types in which establishment of the X2 link should be restricted.

Figure 26:
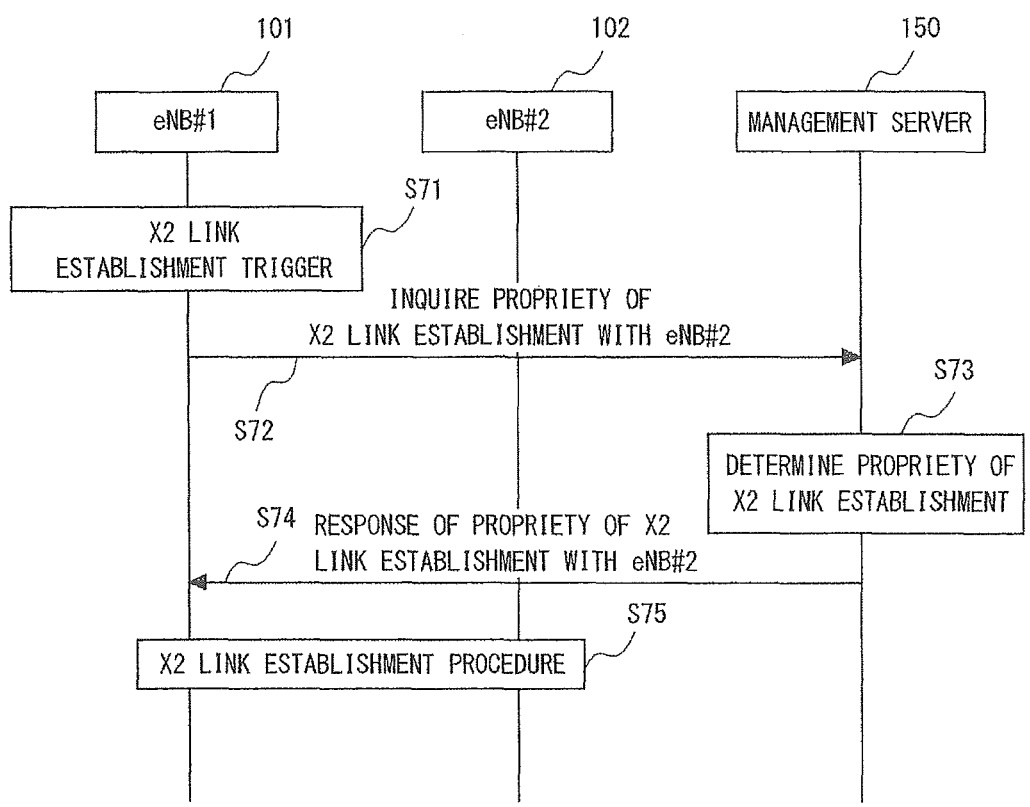
FIG. 26 is a sequence diagram showing operation of the mobile communication system according to the fifth embodiment of the present invention.

FIG. 26 is a sequence diagram showing operation of the mobile communication system according to the fifth embodiment of the present invention. Hereinafter, with reference to FIG. 26, will be explained operation in the eNB 101 detecting the eNB 102 by means of the ANR function and trying to establish an X2 link.

When an X2 link establishment trigger by means of the ANR function is generated in the eNB 101 (step S71), the eNB 101 inquires of the management server 150 propriety of establishment of the X2 link with the eNB 102 (step S72).

When receiving the inquiry from the eNB 101, the management server 150 determines the propriety of establishment of the X2 link with the eNB 102 using the holding database (step S73). For example, the management server 150 refers to the database of FIG. 25 that the management server 150 has based on an eNB ID of the source eNB 101 included in the inquiry from the eNB 101 and an eNB ID of the opposing eNB 102, and confirms whether or not an eNB type of the opposing eNB 102 is included in the eNB types in which establishment of the X2 link should be restricted in the eNB 101. It is to be noted that the management server 150 may confirm whether or not an eNB type of the eNB 101 is included in the eNB types in which establishment of the X2 link should be restricted in the opposing eNB 102 to thereby determine the propriety of establishment of the X2 link.

If in step S73, the eNB type of the eNB 102 does not fall under the eNB types in which establishment of the X2 link should be restricted, the management server 150 transmits to the eNB 101 a response of approving establishment of the X2 link with the eNB 102 (step S74). When receiving the response, the eNB 101 performs an X2 link establishment procedure (exchange of an X2 SETUP REQUEST message and an X2 SETUP RESPONSE message after establishment of an SCTP link) with the eNB 102 (step S75).

If in step S73, the eNB type of the eNB 102 falls under the eNB types in which establishment of the X2 link should be restricted, the management server 150 transmits to the eNB 101 a response of disapproving establishment of the X2 link with the eNB 102 (step S74). When receiving the response, the eNB 101 does not try to establish the X2 link with the eNB 102.

Although in the above explanation, propriety determination of establishment of the X2 link is performed based on the eNB type of the eNB, similarly to the other embodiments of the present invention, determination criterion is not limited to the eNB type, and various attribution information of the eNB can be used.

As explained above, in the fifth embodiment of the present invention, the management server 150 holds the database in which the eNB type of each of the eNBs in the mobile communication system is previously stored, and determines the propriety of establishment of the X2 link based on the eNB type of the target eNB acquired from the database. Accordingly, determination processing in the eNB becomes unnecessary, and it becomes possible to save resources for the X2 link/SCTP link. In addition, unlike the fourth embodiment of the present invention, it becomes unnecessary to construct the above-described database inside the each eNB.

It is to be noted that although in the fifth embodiment of the present invention, propriety of establishment of an X2 link with a neighboring eNB is determined by the management server 150 whenever the neighboring eNB is detected by means of the ANR function, propriety of establishment of the established X2 links may be determined by the management server 150 only when the number of established X2 links reaches a predetermined value as in the second embodiment of the present invention.

In this case, each eNB is provided with the database of FIG. 7. Additionally, in detecting the neighboring eNB by means of the ANR function, the eNB inquires of the management server 150 propriety of establishment of the established X2 links when the number of established X2 links has reached the maximum number of X2 links in the self-eNB. The management server 150 determines the propriety of establishment of the established X2 links using the database held by the self-server (compares eNB types in which establishment of the X2 link should be restricted in the eNB as an inquiry source with eNB types of the opposing eNBs having the established X2 links), and returns a determination result to the eNB as the inquiry source. The eNB as the inquiry source disconnects the X2 link in accordance with the determination result of the management server 150.

Next, a sixth embodiment of the present invention will be explained. Although in the fifth embodiment of the present invention, the management server 150 holds the database in which attribution information of each of the eNBs in the mobile communication system is previously stored, in the sixth embodiment of the present invention, the management server 150 need not hold such database, and when receiving from the eNB an inquiry of propriety of establishment of an X2 link with a neighboring eNB, the management server 150 inquires attribution information of the neighboring eNB, and determines the propriety of establishment of the X2 link. It is to be noted that although a basic configuration of the sixth embodiment of the present invention is the same as that of the fifth embodiment of the present invention, the management server 150 inquires attribution information of the eNB and acquires it in the following explanation, and thus it need not hold the database of FIG. 25.

Figure 27:
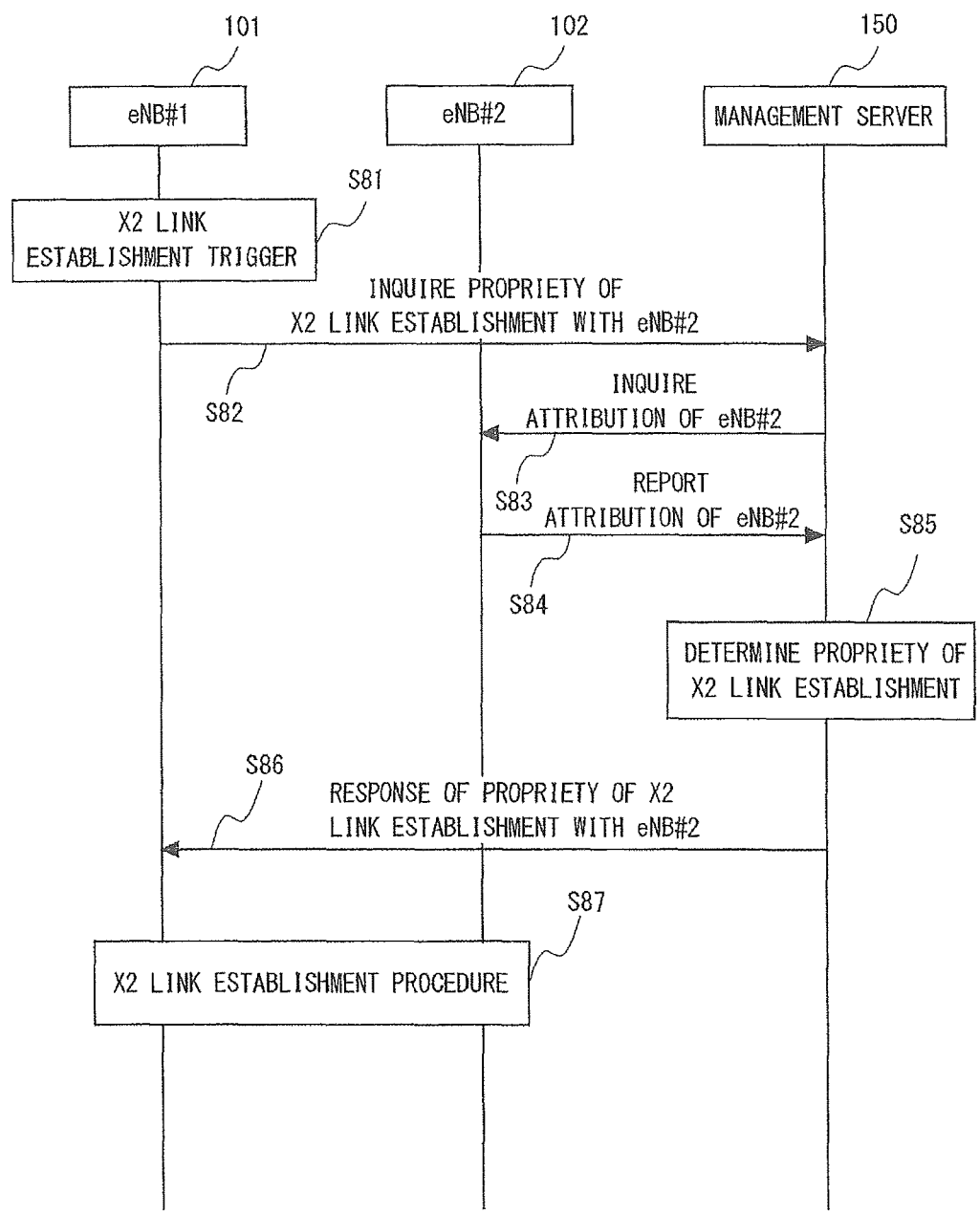
FIG. 27 is a sequence diagram showing operation of a mobile communication system according to the sixth embodiment of the present invention.

FIG. 27 is a sequence diagram showing operation of a mobile communication system according to the sixth embodiment of the present invention. FIG. 28 is a database held by the management server 150 in the sixth embodiment of the present invention. In the database of FIG. 28, previously registered are an identifier (eNB ID) of each of eNBs in the mobile communication system and an eNB type thereof in which establishment of the X2 link should be restricted.

Hereinafter, with reference to FIG. 27, will be explained operation in the eNB 101 detecting the eNB 102 by means of the ANR function and trying to establish an X2 link.

When an X2 link establishment trigger by means of the ANR function is generated in the eNB 101 (step S81), the eNB 101 inquires of the management server 150 propriety of establishment of the X2 link with the eNB 102 (step S82). When receiving the inquiry from the eNB 101, the management server 150 inquires an eNB type of the eNB 102 (step S83). The eNB 102 reports the eNB type of the eNB 102 to the management server 150 (step S84).

The management server 150 determines propriety of establishment of the X2 link between the eNBs 101 and 102 based on the acquired eNB type of the eNB 102 (step S85). Namely, the management server 150 confirms the eNB types in which establishment of the X2 link should be restricted in the eNB 101 from an eNB ID of the source eNB 101 included in the inquiry from the eNB 101, and the database of FIG. 28. The management server 150 then confirms whether or not the eNB type of the eNB 102 is included in the eNB types in which establishment of the X2 link should be restricted in the eNB 101 to thereby determine the propriety of establishment of the X2 link.

If in step S85, the eNB type of the eNB 102 does not fall under the eNB types in which establishment of the X2 link should be restricted, the management server 150 transmits to the eNB 101 a response of approving establishment of the X2 link with the eNB 102 (step S86). When receiving the response, the eNB 101 performs an X2 link establishment procedure (exchange of an X2 SETUP REQUEST message and an X2 SETUP RESPONSE message after establishment of an SCTP link) with the eNB 102 (step S87).

If in step S85, the eNB type of the eNB 102 falls under the eNB types in which establishment of the X2 link should be restricted, the management server 150 transmits to the eNB 101 a response of disapproving establishment of the X2 link with the eNB 102 (step S86). When receiving the response, the eNB 101 does not try to establish the X2 link with the eNB 102.

Although the management server 150 holds the database of FIG. 28 in the above explanation, it may hold a database of FIG. 29 instead of the database of FIG. 28. In the database of FIG. 29, registered is information of eNB type combinations in which establishment of the X2 link should be restricted. In an example of FIG. 29, establishment of X2 links between eNBs of the Macro eNB and the Pico eNB, eNBs of the Macro eNB and the HeNB, and eNBs of the Micro eNB and the HeNB is disapproved, respectively. If an eNB type of the eNB 101 is included in the inquiry of step S82, the management server 150 can determine propriety of establishment of the X2 link between the eNBs 101 and 102 using the database of FIG. 29 in step S85.

In addition, although in the above explanation, propriety determination of establishment of the X2 link is performed based on the eNB type of the eNB, similarly to the other embodiments of the present invention, determination criterion is not limited to the eNB type, and various attribution information of the eNB can be used.

As explained above, in the sixth embodiment of the present invention, when receiving from the eNB the inquiry of propriety of establishment of the X2 link with the neighboring eNB, the management server 150 inquires attribution information of the neighboring eNB, and determines the propriety of establishment of the X2 link. Accordingly, determination processing in the eNB becomes unnecessary, and it becomes possible to save resources for the X2 link/SCTP link. In addition, unlike the fifth embodiment of the present invention, it becomes unnecessary to construct inside the management server a database in which attribution information of each of the eNBs in the mobile communication system is previously stored. In addition, the management server 150 inquires attribution information of the eNB and acquires it, the sixth embodiment of the present invention is suitable also for the case of using dynamically changing information, such as the number of users, for the propriety determination of establishment of the X2 link.

It is to be noted that although in the sixth embodiment of the present invention, propriety of establishment of an X2 link with a neighboring eNB is determined by the management server 150 whenever the neighboring eNB is detected by means of the ANR function, propriety of establishment of the established X2 links may be determined by the management server 150 only when the number of established X2 links reaches a predetermined value as in the second embodiment of the present invention.

In this case, each eNB is provided with the database of FIG. 7. Additionally, in detecting the neighboring eNB by means of the ANR function, the eNB inquires of the management server 150 propriety of establishment of the established X2 links when the number of established X2 links has reached the maximum number of X2 links in the self-eNB. The management server 150 inquires an eNB type of each of opposing eNBs having the established X2 links and acquires it, determines the propriety of establishment of the established X2 links (compares eNB types in which establishment of the X2 link should be restricted in the eNB as an inquiry source with the eNB types of the opposing eNBs having the established X2 links), and returns a determination result to the eNB as the inquiry source. The eNB as the inquiry source disconnects the X2 link in accordance with the determination result of the management server 150.

Next, a seventh embodiment of the present invention will be explained. Although in the sixth embodiment of the present invention, the management server 150 inquires and acquires attribution information of the neighboring eNB when receiving from the eNB the inquiry of propriety of establishment of the X2 link with the neighboring eNB, in the seventh embodiment of the present invention, each eNB regularly reports attribution information to the management server 150, or the management server 150 regularly acquires the attribution information of the each eNB.

It is to be noted that a basic configuration of the seventh embodiment of the present invention is the same as that of the fifth embodiment of the present invention. However, since attribution information is regularly acquired from each eNB in the seventh embodiment of the present invention, the embodiment is more suitable for the case of using dynamically changing information, such as the number of users. Therefore, the number of users is used as attribution information in the following explanation. Accordingly, in the seventh embodiment of the present invention, unlike the fifth embodiment of the present invention, the management server 150 is provided with a database in which the number of users of each eNB is stored instead of the database of FIG. 25, and the database is updated whenever information of the number of users is acquired from the each eNB.

Figure 30:
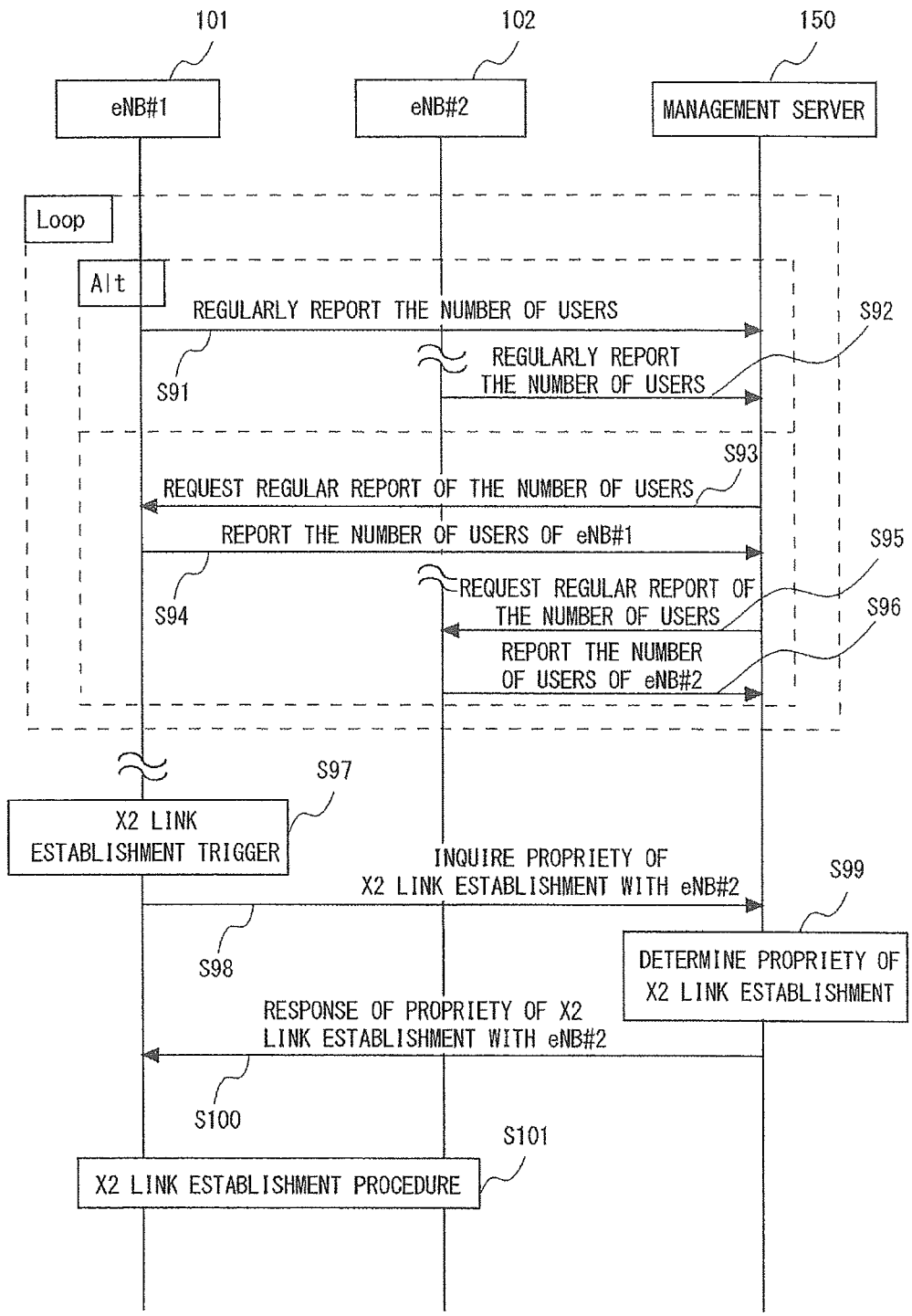
FIG. 30 is a sequence diagram showing operation of a mobile communication system according to the seventh embodiment of the present invention.
Figures 31, 32:
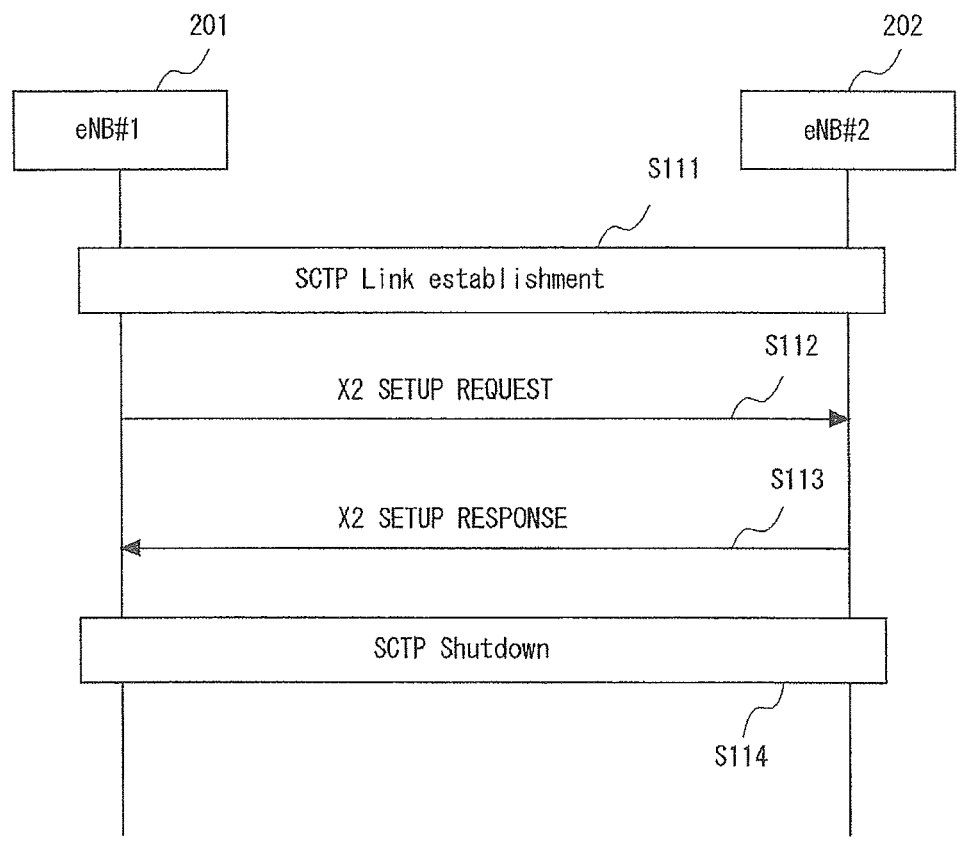
FIG. 31 is a database held by the management server in the seventh embodiment of the present invention.
FIG. 32 is a sequence diagram of an X2 message exchanged between eNBs.

FIG. 30 is a sequence diagram showing operation of a mobile communication system according to the seventh embodiment of the present invention. FIG. 31 is a database held by the management server 150 in the seventh embodiment of the present invention. In the database of FIG. 31, stored are an identifier (eNB ID) of each of eNBs in the mobile communication system and information of the number of users thereof. As mentioned above, the database is updated whenever information of the number of users is acquired from each eNB.

Hereinafter, with reference to FIG. 30, will be explained operation of the mobile communication system according to the seventh embodiment of the present invention.

Each of the eNBs 101 and 102 regularly reports the number of users of the self-eNB to the management server 150 (steps S91 and S92). As described above, instead of each eNB autonomously reporting the number of users to the management server 150, the management server 150 may regularly inquire of the each eNB. In this case, the management server 150 regularly sends a report request of the number of users to the eNBs 101 and 102 (steps S93 and S95). In contrast with this, each of the eNBs 101 and 102 regularly reports the number of users of the self-eNB to the management server 150 (steps S94 and S96). It is to be noted that when receiving a report of the number of users, the management server 150 updates the database of FIG. 31.

Next, will be explained operation in the eNB 101 detecting the eNB 102 by means of the ANR function and trying to establish an X2 link. When an X2 link establishment trigger by means of the ANR function is generated in the eNB 101 (step S97), the eNB 101 inquires of the management server 150 propriety of establishment of the X2 link with the eNB 102 (step S98).

The management server 150 determines propriety of establishment of the X2 link between the eNBs 101 and 102 based on the information of the number of users in the database of FIG. 31 (step S99). Namely, the management server 150 confirms the number of users of the eNB 102 from an eNB ID of the eNB 102 included in the inquiry from the eNB 101, and the database of FIG. 31. The management server 150 compares the number of users of the eNB 102 with a predetermined threshold value, and performs propriety determination of establishment of the X2 link.

If the number of users of the eNB 102 is not less than the threshold value in step S99, the management server 150 transmits to the eNB 101 a response of approving establishment of the X2 link with the eNB 102 (step S100). When receiving the response, the eNB 101 performs an X2 link establishment procedure (exchange of an X2 SETUP REQUEST message and an X2 SETUP RESPONSE message after establishment of an SCTP link) with the eNB 102 (step S101).

If the number of users of the eNB 102 is less than the threshold value in step S99, the management server 150 transmits to the eNB 101 a response of disapproving establishment of the X2 link with the eNB 102 (step S100). When receiving the response, the eNB 101 does not try to establish the X2 link with the eNB 102.

Although in the above explanation, propriety determination of establishment of the X2 link is performed based on the number of users of the eNB, similarly to the other embodiments of the present invention, determination criterion is not limited to the number of users, and various attribution information of the eNB can be used.

As explained above, in the seventh embodiment of the present invention, the management server 150 regularly acquires the attribution information of the each eNB, and when receiving from the eNB an inquiry of propriety of establishment of an X2 link with a neighboring eNB, the management server 150 determines the propriety of establishment of the X2 link. Accordingly, determination processing in the eNB becomes unnecessary, and it becomes possible to save resources for the X2 link/SCTP link. In addition, the management server 150 need not inquire attribution information of the eNB at the time of receiving the inquiry of propriety of establishment of the X2 link as in the sixth embodiment of the present invention. In addition, since attribution information is regularly acquired from each eNB, the embodiment is more suitable for the case of using dynamically changing information, such as the number of users.

It is to be noted that although in the seventh embodiment of the present invention, propriety of establishment of an X2 link with a neighboring eNB is determined by the management server 150 whenever the neighboring eNB is detected by means of the ANR function, propriety of establishment of the established X2 links may be determined by the management server 150 only when the number of established X2 links reaches a predetermined value as in the third embodiment of the present invention.

In this case, each eNB is provided with the database of FIG. 7. Additionally, in detecting the neighboring eNB by means of the ANR function, the eNB inquires of the management server 150 propriety of establishment of the established X2 links when the number of established X2 links, for example, has reached the maximum number of X2 links in the self-eNB. In this inquiry, included is an eNB ID of each of opposing eNBs having the established X2 links. The management server 150 confirms the number of users of each of the opposing eNBs from the eNB ID and the database of FIG. 31, determines propriety of establishment of the established X2 links based on the number of users, and selects the X2 link that should be disconnected. Specifically, selected is the X2 link with the opposing eNB that has the lowest number of users or the lowest number of users less than the threshold value. The management server 150 returns the determination result to the eNB as an inquiry source. The eNB as the inquiry source disconnects the X2 link in accordance with the determination result of the management server 150.

While the present invention has been described above with reference to exemplary embodiments, the present invention is not limited to the exemplary embodiments stated above. The configuration and details of the present invention can be modified in various manners which can be understood by those skilled in the art within the scope of the invention. For example, the following forms may be employed.

(Supplementary Note 1)

A radio base station in a mobile communication system, including determination means for determining propriety of establishment of an established logical interface based on attribution information of a neighboring radio base station notification of which is performed from the neighboring radio base station in establishment of the established logical interface, when the number of established logical interfaces with the neighboring radio base station has reached a predetermined value.

(Supplementary Note 2)

A radio base station in a mobile communication system, including:

transmission means for regularly notifying of attribution information of the self-base station a neighboring radio base station in which a logical interface has been established with the self-base station; and determination means for determining propriety of establishment of an established logical interface based on the attribution information notification of which is performed from the transmission means of the neighboring radio base station, when the number of established logical interfaces with the neighboring radio base station has reached a predetermined value.

(Supplementary Note 3)

A radio base station in a mobile communication system, including:

storage means for storing attribution information of each of other radio base stations; and determination means for determining propriety of establishment of an established logical interface based on the attribution information of a neighboring radio base station stored in the storage means, when the number of established logical interfaces with the neighboring radio base station has reached a predetermined value.

(Supplementary Note 4)

A server that is connected to radio base stations in a mobile communication system, including:

storage means for storing attribution information of each of the radio base stations; and determination means for determining propriety of establishment of an established logical interface based on the attribution information of a neighboring radio base station stored in the storage means, when a request of propriety determination of establishment of the established logical interface is received from a radio base station in which the number of established logical interfaces with the neighboring radio base station has reached a predetermined value among the radio base stations.

(Supplementary Note 5)

A server that is connected to radio base stations in a mobile communication system, including:

means for acquiring attribution information of a neighboring radio base station from the neighboring radio base station, when a request of propriety determination of establishment of an established logical interface is received from a radio base station in which the number of established logical interfaces with the neighboring radio base station has reached a predetermined value among the radio base stations; and determination means for determining propriety of establishment of the established logical interface based on the acquired attribution information.

(Supplementary Note 6)

A server that is connected to radio base stations in a mobile communication system, including:

means for regularly acquiring attribution information of each of the radio base stations; and determination means for determining propriety of establishment of a logical interface based on the acquired attribution information of a neighboring radio base station, when a request of propriety determination of establishment of the logical interface with the neighboring radio base station is received from one of the radio base stations.

(Supplementary Note 7)

A server that is connected to radio base stations in a mobile communication system, including:

means for regularly acquiring attribution information of each of the radio base stations; and determination means for determining propriety of establishment of an established logical interface based on the acquired attribution information of a neighboring radio base station, when a request of propriety determination of establishment of the established logical interface is received from a radio base station in which the number of established logical interfaces with the neighboring radio base station has reached a predetermined value among the radio base stations.

(Supplementary Note 8)

A mobile communication system including a radio base station, in which the radio base station includes determination means for determining propriety of establishment of a logical interface with a neighboring radio base station based on attribution information of the neighboring radio base station.

(Supplementary Note 9)

The mobile communication system according to Supplementary note 8, in which the determination means determines propriety of establishment of a logical interface based on the attribution information notification of which is performed from a neighboring radio base station in establishment of the logical interface with the neighboring radio base station.

(Supplementary Note 10)

The mobile communication system according to Supplementary note 8, in which the radio base station includes storage means for storing attribution information of each of other radio base stations, and in which the determination means determines propriety of establishment of a logical interface based on attribution information of a neighboring radio base station stored in the storage means in establishment of the logical interface with the neighboring radio base station.

(Supplementary Note 11)

A mobile communication system, including:

radio base stations; and a server that is connected to the radio base stations, in which the server includes determination means for determining propriety of establishment of a logical interface between the radio base stations based on attribution information of the radio base stations.

(Supplementary Note 12)

The mobile communication system according to Supplementary note 11, in which the server includes storage means for storing attribution information of each of the radio base stations, and in which when receiving from one of the radio base stations a request of propriety determination of establishment of a logical interface with a neighboring radio base station, the determination means determines propriety of establishment of the logical interface based on attribution information of the neighboring radio base station stored in the storage means.

(Supplementary Note 13)

The mobile communication system according to Supplementary note 11, in which the server includes means for acquiring attribution information of a neighboring radio base station from the neighboring radio base station, when receiving from one of the radio base stations a request of propriety determination of establishment of a logical interface with the neighboring radio base station, and in which the determination means determines propriety of establishment of the logical interface based on the acquired attribution information.

(Supplementary Note 14)

The mobile communication system according to Supplementary note 11, in which the server includes means for regularly acquiring attribution information of each of the radio base stations, and in which when receiving from one of the radio base stations a request of propriety determination of establishment of a logical interface with a neighboring radio base station, the determination means determines propriety of establishment of the logical interface based on the acquired attribution information of the neighboring radio base station.

The present application claims priority rights of and is based on Japanese Patent Application No. 2011-272879 filed on Dec. 14, 2011 in the Japanese Patent Office, the entire contents of which are hereby incorporated by reference.

REFERENCE SIGNS LIST 11, 21 Control Unit
12, 22 Communication Unit
13, 23 Determination Unit
14, 24 Storage Unit
15 Radio Communication Unit
101,102 eNB
150 Management Server

The invention claimed is:

1. A base station of a mobile communication system, the base station comprising:

a transmitter of the base station which periodically sends a notification of an attribution information to a neighboring base station that has already established a logical link with the base station, wherein the base station makes a decision to establish or not to establish the logical link with the neighboring base station by using the attribution information of the neighboring base station, a notification of which is sent from a transmitter of the neighboring base station when a number of established logical links with the neighboring base station has reached a predetermined threshold value.

2. The base station according to claim 1, wherein prior to establishing the logical link with the neighboring base station using the attribution information notification which is performed from the neighboring base station.

3. The base station according to claim 1, further comprising a storage unit that stores attribution information of each of other neighboring base stations, wherein, prior to establishing the logical interface with the neighboring radio base stations, the base station uses the attribution information stored in the storage unit.

4. The base station according to claim 1, wherein the attribution information of the neighboring base station comprises a type of the neighboring base station.

5. The base station according to claim 4, wherein the attribution information of the neighboring base station further comprises a number of users that can be accommodated by the neighboring base station and a reference signal power.

6. The base station according to claim 1, wherein the determining confirms whether the logical link include a disconnectable logical link.

7. The base station according to claim 1, wherein, when the number of established logical links with the neighboring base station is less than the predetermined number, the base station establishes the logical link with another newly-detected neighboring base station.

8. An operation control method for a radio base station of a mobile communication system, the operation control method comprising:

periodically sending a notification of attribution information to a neighboring base station that has already established a logical link with the base station, determining whether to establish or not to establish the logical link with the neighboring base station is based on the attribution information of the neighboring base station, a notification of which is sent from a transmitter of the neighboring base station when a number of established logical links with the neighboring station has reached a predetermined threshold value.

9. The operation control method according to claim 8, wherein the attribution information of the neighboring base station comprises a type of the neighboring base station.

10. The operation control method according to claim 9, wherein the attribution information of the neighboring base station further comprises a number of users that can be accommodated by the neighboring base station and a reference signal power.

11. The operation control method according to claim 8, wherein said determining comprises confirming whether the logical links include a disconnectable logical link.

12. The operation control method according to claim 8, wherein when the number of established logical links with the neighboring base station is less than the predetermined number, the base station establishes the logical link with another newly-detected neighboring base station.

13. A server that is connected to base stations of a mobile communication system, the server comprising:
 a receiver that receives from a base station an inquiry regarding establishment of a logical link with neighboring base stations,
 determining by the server to approve or disapprove the request based on the attribution information of the neighboring base stations, a notification of which is sent from the transmitter of the neighboring base stations when a number of established logical links with the neighboring base stations has reached a predetermined threshold value.

14. The server according to claim 13, further comprising a storage unit that stores attribution information of each of the base stations,
 wherein, when receiving from one of the base stations a request to establish the logical link with a neighboring base station, determining by the server to approve or disapprove the request by using the attribution information of the neighboring base station stored in the storage unit.

15. The server according to claim 13, further comprising a unit that acquires attribution information of the neighboring base stations from the neighboring base stations, when receiving from one of the radio base station a request to establish the logical link with the neighboring base station, wherein, determining to approve or disapprove the logical link by using the acquired attribution information.

16. The server according to claim 13, wherein the attribution information of the neighboring base station comprises a type of the neighboring base station, a number of users that can be accommodated by the neighboring base station, and a reference signal power.

17. The server according to claim 13, wherein, when the number of established logical links between the first base station and the second base station is less than the predetermined number, the first base station establishes the logical interface with another newly-detected neighboring base station.

* * * * *